United States Patent
Shrestha et al.

(10) Patent No.: US 12,507,194 B2
(45) Date of Patent: *Dec. 23, 2025

(54) CHANGE OF TRACKING AREA CODE FOR WIRELESS NETWORKS

(71) Applicant: QUALCOMM Incorporated, San Diego, CA (US)

(72) Inventors: Bharat Shrestha, San Diego, CA (US); Umesh Phuyal, San Diego, CA (US); Alberto Rico Alvarino, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,738

(22) Filed: Mar. 6, 2023

(65) Prior Publication Data

US 2023/0209492 A1   Jun. 29, 2023

Related U.S. Application Data

(63) Continuation of application No. 17/222,650, filed on Apr. 5, 2021, now Pat. No. 11,632,735.
(Continued)

(51) Int. Cl.
*H04B 7/185* (2006.01)
*H04W 24/08* (2009.01)
*H04W 60/04* (2009.01)
*H04W 68/00* (2009.01)
*H04W 76/11* (2018.01)
*H04W 84/06* (2009.01)

(52) U.S. Cl.
CPC ......... *H04W 60/04* (2013.01); *H04W 24/08* (2013.01); *H04W 68/005* (2013.01); *H04W 76/11* (2018.02); *H04W 84/06* (2013.01)

(58) Field of Classification Search
CPC ... H04W 60/04; H04W 24/08; H04W 68/005; H04W 76/11; H04W 84/06; H04W 8/26;
(Continued)

(56) References Cited

U.S. PATENT DOCUMENTS

2021/0321357 A1   10/2021   Shrestha et al.

FOREIGN PATENT DOCUMENTS

| CN | 109699051 A | 4/2019 |
|---|---|---|
| WO | WO-2019075659 A1 | 4/2019 |

(Continued)

OTHER PUBLICATIONS

3GPP TR 38.821, Solutions for NR to support non-terrestrial networks (NTN), Release 16, Dec. 2019 (Year: 2019).*
(Continued)

*Primary Examiner* — Said M Elnoubi
(74) *Attorney, Agent, or Firm* — Holland & Hart LLP/Qualcomm

(57) ABSTRACT

Methods, systems, and devices for wireless communications are described. In some non-terrestrial networks, the movement of satellites may result in the movement of cell coverage. A user equipment (UE) may experience changing cell coverage due to the movement of cell coverage, even if the UE is stationary. A UE may be configured to determine a cell is serving two or more earth-fixed tracking areas, determine whether to monitor paging resources of a first earth-fixed tracking area or a second earth-fixed tracking area, and monitor the selected paging resources. In some aspects, the UE may determine that a cell serves two or more earth-fixed tracking areas based on a received control message including multiple tracking area indicators. In some aspects, the UE may determine which paging resources to monitor based on a geographic position of the UE.

26 Claims, 20 Drawing Sheets

Related U.S. Application Data

(60) Provisional application No. 63/007,346, filed on Apr. 8, 2020.

(58) Field of Classification Search
CPC ..... H04W 48/12; H04W 48/16; H04W 68/04; H04B 7/18526; H04B 7/18528
See application file for complete search history.

(56) References Cited

FOREIGN PATENT DOCUMENTS

| WO | WO-2019148319 A1 | * | 8/2019 | ............ H04W 4/029 |
|----|------------------|---|--------|-------------------------|
| WO | 2021066487 A1 |   | 4/2021 | |

OTHER PUBLICATIONS

3GPP TR 38.821: "3rd Generation Partnership Project, Technical Specification Group Radio Access Network, Solutions for NR to Support Non-Terrestrial Networks (NTN) (Release 16)", 3GPP Standard, Technical Report, 3rd Generation Partnership Project (3GPP), Mobile Competence Centre, 650, Route Des Lucioles, F-06921 Sophia-Antipolis Cedex, France, vol. RAN WG3, No. V16.0.0 (Dec. 2019), Jan. 16, 2020, XP051860814, pp. 1-140, Section 1, Section 5, Section 7.2.1.1, Section 6.2.3, Section 6.2.4, Sections 7.3.1 and 7.3.2.

Ericsson: "Further Detail on Earth Fixed Tracking Area for LEO NTN", 3GPP Draft, R2-1910542, 3GPP TSG-RAN WG2 #107, Further Detail on Earth Fixed Tracking Area for LEO NTN, 3rd Generation Partnership Project (3GPP), Mobile Competence Centre, 650, Route Des Lucioles, F-06921 Sophia-Antipolis , vol. RAN WG2, No. Prague, Czech Republic, Aug. 26, 2019-Aug. 30, 2019, Aug. 15, 2019 (Aug. 15, 2019), XP051768318, 6 Pages.

International Search Report and Written Opinion—PCT/US2021/026042—ISA/EPO—Jul. 27, 2021.

Zte., et al., "Tracking Area Management and Paging Handling in NTN", 3GPP TSG RAN WG3#103, R3-190139, 3rd Generation Partnership Project (3GPP), Mobile Competence Centre, 650, Route Des Lucioles, F-06921 Sophia-Antipolis Cedex, France, vol. RAN WG3, No. Athens, Greece, Feb. 25, 2019-Mar. 1, 2019, Feb. 16, 2019, pp. 1-13, XP051604086, No. 1-15 Page, title, Chapters 1, 2, 8.3, para.2 and para.3.2, the whole document.

* cited by examiner

CHANGE OF TRACKING AREA CODE FOR WIRELESS NETWORKS

CROSS REFERENCE

The present application for patent is a Continuation of U.S. patent application Ser. No. 17/222,650 by SHRESTHA et al., entitled "CHANGE OF TRACKING AREA CODE FOR WIRELESS NETWORKS," filed Apr. 5, 2021, which claims the benefit of U.S. Provisional Patent Application No. 63/007,346 by SHRESTHA et al., entitled "CHANGE OF TRACKING AREA CODE FOR WIRELESS NETWORKS," filed Apr. 8, 2020, each of which is assigned to the assignee hereof, and each of which is expressly incorporated by reference herein.

FIELD OF TECHNOLOGY

The following relates generally to wireless communications and more specifically to change of tracking area codes (TACs) for wireless networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may include one or more non-terrestrial networks (NTNs). In such NTNs, the continuous movement of satellites may result in the continuous movement of cell coverage. A UE may experience changing cell coverage (e.g., handoffs between cells) due to the continuous movement of cell coverage, even if the UE is stationary.

SUMMARY

The described techniques relate to improved methods, systems, devices, and apparatuses that support change of tracking area code (TAC) for non-terrestrial networks (NTNs). Generally, the described techniques enable a UE to determine that a cell of an NTN serves two or more earth-fixed tracking areas (e.g., terrestrial tracking areas), and enable the UE to select and monitor paging resources associated with at least one terrestrial tracking area served by the cell.

A method for wireless communication at a user equipment (UE) is described. The method may include receiving system information that includes an indication that a first cell of a NTN is associated with a first tracking area indicator and a second tracking area indicator, determining, based on the system information, that the first cell serves a first earth-fixed tracking area associated with the first tracking area indicator and a second earth-fixed tracking area associated with the second tracking area indicator, and monitoring paging resources associated with the first earth-fixed tracking area based on determining that the first cell serves the first earth-fixed tracking area and the second earth-fixed tracking area.

An apparatus for wireless communication at a UE is described. The apparatus may include a processor, memory coupled with the processor, and instructions stored in the memory. The instructions may be executable by the processor to cause the apparatus to receive system information that includes an indication that a first cell of a NTN is associated with a first tracking area indicator and a second tracking area indicator, determine, based on the system information, that the first cell serves a first earth-fixed tracking area associated with the first tracking area indicator and a second earth-fixed tracking area associated with the second tracking area indicator, and monitor paging resources associated with the first earth-fixed tracking area based on determining that the first cell serves the first earth-fixed tracking area and the second earth-fixed tracking area.

Another apparatus for wireless communication at a UE is described. The apparatus may include means for receiving system information that includes an indication that a first cell of a NTN is associated with a first tracking area indicator and a second tracking area indicator, means for determining, based on the system information, that the first cell serves a first earth-fixed tracking area associated with the first tracking area indicator and a second earth-fixed tracking area associated with the second tracking area indicator, and means for monitoring paging resources associated with the first earth-fixed tracking area based on determining that the first cell serves the first earth-fixed tracking area and the second earth-fixed tracking area.

A non-transitory computer-readable medium storing code for wireless communication at a UE is described. The code may include instructions executable by a processor to receive system information that includes an indication that a first cell of a NTN is associated with a first tracking area indicator and a second tracking area indicator, determine, based on the system information, that the first cell serves a first earth-fixed tracking area associated with the first tracking area indicator and a second earth-fixed tracking area associated with the second tracking area indicator, and monitor paging resources associated with the first earth-fixed tracking area based on determining that the first cell serves the first earth-fixed tracking area and the second earth-fixed tracking area.

Some examples of the method, apparatuses, and non-transitory computer-readable medium described herein may further include operations, features, means, or instructions for determining a terrestrial location of the UE and determining that the UE may be positioned within the first earth-fixed tracking area based on determining the terrestrial location of the UE, where monitoring the paging resources associated with the first earth-fixed tracking area may be based on determining that the UE may be positioned within the first earth-fixed tracking area.

Some examples of the method, apparatuses, and non-transitory computer-readable medium described herein may further include operations, features, means, or instructions for determining that the UE was associated with the first earth-fixed tracking area prior to the first cell serving the first earth-fixed tracking area and the second earth-fixed tracking area, where monitoring the paging resources associated with the first earth-fixed tracking area may be based on determining that the UE was associated with the first earth-fixed tracking area.

In some examples of the method, apparatuses, and non-transitory computer-readable medium described herein, one of the first tracking area indicator or the second tracking area indicator includes a temporary tracking area indicator or shorter validity indicator.

Some examples of the method, apparatuses, and non-transitory computer-readable medium described herein may further include operations, features, means, or instructions for determining a paging message for the first earth-fixed tracking area based on whether the first earth-fixed tracking area includes the temporary tracking area indicator, where monitoring the paging resources of the first earth-fixed tracking area may be based on determining the paging message.

In some examples of the method, apparatuses, and non-transitory computer-readable medium described herein, the second earth-fixed tracking area includes the temporary tracking area indicator and the method, apparatuses, and non-transitory computer-readable medium may include further operations, features, means, or instructions for identifying that a validity time associated with the temporary tracking area indicator may be less than or equal a threshold validity time, where monitoring the paging resources associated with the first earth-fixed tracking area may be based on the validity time being less than or equal to the threshold validity time.

Some examples of the method, apparatuses, and non-transitory computer-readable medium described herein may further include operations, features, means, or instructions for receiving, via the system information, an indication of boundary information associated with an earth-fixed tracking area associated with the temporary tracking area indicator, where monitoring the paging resources associated with the first earth-fixed tracking area may be based on the boundary information.

Some examples of the method, apparatuses, and non-transitory computer-readable medium described herein may further include operations, features, means, or instructions for receiving a master information block (MIB) message including one or more fields associated with temporary tracking area indicators, where the one or more fields indicate whether the system information includes data associated with the temporary tracking area indicator.

Some examples of the method, apparatuses, and non-transitory computer-readable medium described herein may further include operations, features, means, or instructions for identifying a validity time associated with the temporary tracking area indicator based on receiving the system information and removing the temporary tracking area indicator from a tracking area indicator list of the UE upon expiration of the validity time associated with the temporary tracking area indicator.

Some examples of the method, apparatuses, and non-transitory computer-readable medium described herein may further include operations, features, means, or instructions for storing the temporary tracking area indicator and one of the first tracking area indicator or the second tracking area indicator in the tracking area indicator list of the UE based on receiving the system information, where removing the temporary tracking area indicator from the tracking area indicator list may be based on storing the temporary tracking area indicator and one of the first tracking area indicator or the second tracking area indicator in the tracking area indicator list.

In some examples of the method, apparatuses, and non-transitory computer-readable medium described herein, the second tracking area indicator includes the temporary tracking area indicator and the method, apparatuses, and non-transitory computer-readable medium may include further operations, features, means, or instructions for identifying that the UE was associated with the first cell serving the first earth-fixed tracking area and the second earth-fixed tracking area and identifying that the UE may be associated with the first earth-fixed tracking area based on identifying that the UE was associated with the first cell, where monitoring the paging resources may be based on determining that the UE may be associated with the first earth-fixed tracking area.

In some examples of the method, apparatuses, and non-transitory computer-readable medium described herein, the second tracking area indicator includes the temporary tracking area indicator and the method, apparatuses, and non-transitory computer-readable medium may include further operations, features, means, or instructions for identifying that the UE was not associated with the first cell serving the first earth-fixed tracking area and the second earth-fixed tracking area and identifying that the UE may be associated with the first earth-fixed tracking area based on identifying that the UE was not associated with the first cell, where monitoring the paging resources may be based on determining that the UE may be associated with the first earth-fixed tracking area.

Some examples of the method, apparatuses, and non-transitory computer-readable medium described herein may further include operations, features, means, or instructions for determining whether to perform a registration update based on the first tracking area indicator and the second tracking area indicator.

In some examples of the method, apparatuses, and non-transitory computer-readable medium described herein, the first tracking area indicator may be indicated via a first tracking area indicator field of the system information and the second tracking area indicator may be indicated via a second tracking area indicator field of the system information.

In some examples of the method, apparatuses, and non-transitory computer-readable medium described herein, determining that the first cell serves the first earth-fixed tracking area and the second earth-fixed tracking area may include operations, features, means, or instructions for determining that a tracking area indicator included in a control message may be associated with the first earth-fixed tracking area and a temporary tracking area indicator included in the control message may be associated with the second earth-fixed tracking area of the NTN.

Some examples of the method, apparatuses, and non-transitory computer-readable medium described herein may further include operations, features, means, or instructions for reporting the first earth-fixed tracking area and the second earth-fixed tracking area to a non-access stratum of the UE.

In some examples of the method, apparatuses, and non-transitory computer-readable medium described herein, monitoring the paging resources associated with the first earth-fixed tracking area may include operations, features, means, or instructions for monitoring a paging message associated with the first earth-fixed tracking area using a first paging radio network temporary identifier (P-RNTI) that may be different than a second P-RNTI associated with the second earth-fixed tracking area.

Some examples of the method, apparatuses, and non-transitory computer-readable medium described herein may further include operations, features, means, or instructions for receiving a system information broadcast (SIB) message associated with the first cell that indicates a P-RNTI associated with the first earth-fixed tracking area and a temporary P-RNTI associated with the second earth-fixed tracking area and monitoring a paging message associated with the first earth-fixed tracking area using the P-RNTI associated with the first earth-fixed tracking area.

Some examples of the method, apparatuses, and non-transitory computer-readable medium described herein may further include operations, features, means, or instructions for receiving a downlink control information (DCI) that includes an indication of whether a paging message may be associated with the first earth-fixed tracking area or may be associated with the second earth-fixed tracking area, where monitoring the paging resources associated with the first earth-fixed tracking area may be based on receiving the DCI.

In some examples of the method, apparatuses, and non-transitory computer-readable medium described herein, the DCI includes a first value of the indication for the paging message being associated with the first earth-fixed tracking area or a second value of the indication for the paging message being associated with the second earth-fixed tracking area.

Some examples of the method, apparatuses, and non-transitory computer-readable medium described herein may further include operations, features, means, or instructions for determining that a first paging message may be associated with the first earth-fixed tracking area and that a second paging message may be associated with the second earth-fixed tracking area based on receiving the DCI.

In some examples of the method, apparatuses, and non-transitory computer-readable medium described herein, the DCI includes a first value of the indication for the paging message being associated with the first earth-fixed tracking area, a second value of the indication for the paging message being associated with the second earth-fixed tracking area, or a third value of the indication for the paging message being associated with both the first earth-fixed tracking area and the second earth-fixed tracking area.

Some examples of the method, apparatuses, and non-transitory computer-readable medium described herein may further include operations, features, means, or instructions for determining the paging resources associated with the first earth-fixed tracking area and second paging resources associated with the second earth-fixed tracking area may be the same.

Some examples of the method, apparatuses, and non-transitory computer-readable medium described herein may further include operations, features, means, or instructions for selecting to communicate with the first cell of the NTN, where monitoring the paging resources associated with the first earth-fixed tracking area may be based on selecting to communicate with the first cell.

A method for wireless communication at a base station is described. The method may include transmitting, to a UE, system information that includes an indication that a first cell of a NTN is associated with a first tracking area indicator and a second tracking area indicator, determining, based on the system information, that the first cell serves a first earth-fixed tracking area associated with the first tracking area indicator and a second earth-fixed tracking area associated with the second tracking area indicator, and transmitting one or more first paging messages associated with the first earth-fixed tracking area and one or more second paging messages associated with the second earth-fixed tracking area based on determining that the first cell serves the first earth-fixed tracking area and the second earth-fixed tracking area.

An apparatus for wireless communication at a base station is described. The apparatus may include a processor, memory coupled with the processor, and instructions stored in the memory. The instructions may be executable by the processor to cause the apparatus to transmit, to a UE, system information that includes an indication that a first cell of a NTN is associated with a first tracking area indicator and a second tracking area indicator, determine, based on the system information, that the first cell serves a first earth-fixed tracking area associated with the first tracking area indicator and a second earth-fixed tracking area associated with the second tracking area indicator, and transmit one or more first paging messages associated with the first earth-fixed tracking area and one or more second paging messages associated with the second earth-fixed tracking area based on determining that the first cell serves the first earth-fixed tracking area and the second earth-fixed tracking area.

Another apparatus for wireless communication at a base station is described. The apparatus may include means for transmitting, to a UE, system information that includes an indication that a first cell of a NTN is associated with a first tracking area indicator and a second tracking area indicator, means for determining, based on the system information, that the first cell serves a first earth-fixed tracking area associated with the first tracking area indicator and a second earth-fixed tracking area associated with the second tracking area indicator, and means for transmitting one or more first paging messages associated with the first earth-fixed tracking area and one or more second paging messages associated with the second earth-fixed tracking area based on determining that the first cell serves the first earth-fixed tracking area and the second earth-fixed tracking area.

A non-transitory computer-readable medium storing code for wireless communication at a base station is described. The code may include instructions executable by a processor to transmit, to a UE, system information that includes an indication that a first cell of a NTN is associated with a first tracking area indicator and a second tracking area indicator, determine, based on the system information, that the first cell serves a first earth-fixed tracking area associated with the first tracking area indicator and a second earth-fixed tracking area associated with the second tracking area indicator, and transmit one or more first paging messages associated with the first earth-fixed tracking area and one or more second paging messages associated with the second earth-fixed tracking area based on determining that the first cell serves the first earth-fixed tracking area and the second earth-fixed tracking area.

In some examples of the method, apparatuses, and non-transitory computer-readable medium described herein, one of the first tracking area indicator or the second tracking area indicator includes a temporary tracking area indicator or a shorter validity indicator.

Some examples of the method, apparatuses, and non-transitory computer-readable medium described herein may further include operations, features, means, or instructions for transmitting, to the UE via the system information, a validity time associated with the temporary tracking area indicator.

In some examples of the method, apparatuses, and non-transitory computer-readable medium described herein, the second earth-fixed tracking area includes the temporary tracking area indicator and the method, apparatuses, and non-transitory computer-readable medium may include further operations, features, means, or instructions for identifying that a validity time associated with the temporary tracking area indicator may be less than or equal a threshold validity time, where transmitting the one or more first paging messages may be based on the validity time being less than or equal to the threshold validity time.

DETAILED DESCRIPTION

Figure 1:
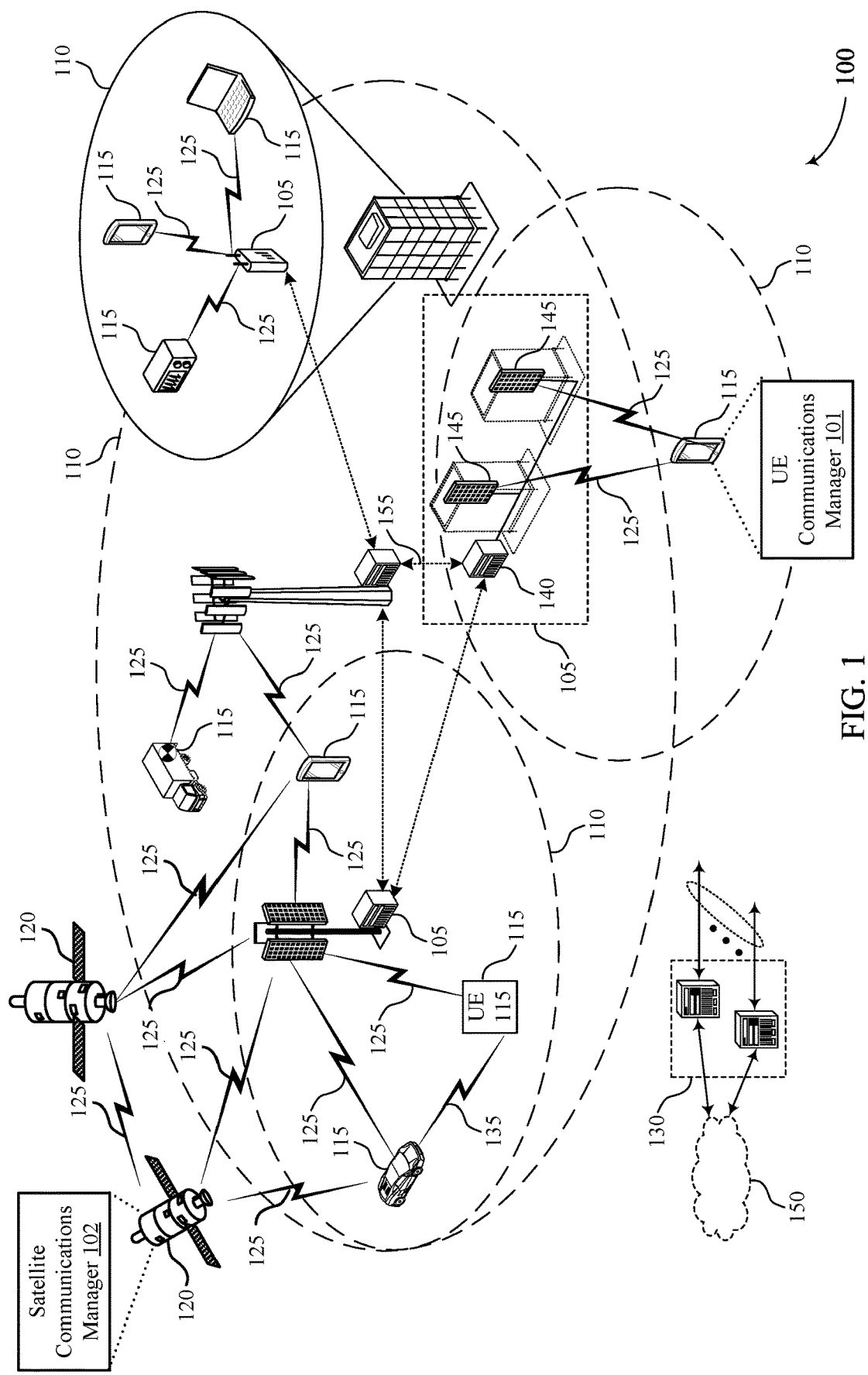
FIG. 1 illustrates an example of a system for wireless communications that supports change of tracking area code (TAC) for wireless networks in accordance with aspects of the present disclosure.

Some wireless communication systems may include one or more non-terrestrial networks (NTNs). In some NTNs, the continuous movement of satellites may result in the continuous movement of cell coverage. A user equipment (UE) may experience changing cell coverage (e.g., handoffs between cells) due to the continuous movement of cell coverage, even if the UE is stationary. Additionally, due to the comparatively large coverage area of satellites, wireless communications systems may use multiple earth-fixed tracking areas (e.g., terrestrial tracking areas) within the satellite coverage area. However, in order to reduce the paging load for each UE, UEs may not be registered for paging with multiple tracking areas, but may be registered for paging with a single tracking area. Accordingly, there is a tradeoff between larger tracking areas, which may result in larger paging loads, and smaller tracking areas, which may result in frequent handoffs between cells as the cell coverage moves with the satellite, as the UE moves throughout the cell, or both. Therefore, there is an opportunity for techniques which efficiently handle tracking area indicator lists associated with moving cells so as to avoid unnecessary registration procedures.

According to some aspects, a UE may be configured to determine a cell is serving two or more earth-fixed tracking areas, determine which paging resources to monitor (e.g., paging resources of first earth-fixed tracking area, or paging resources of second earth-fixed tracking area), and subsequently monitor the selected paging resources. For the purposes of the present disclosure, the terms "earth-fixed tracking area" and "terrestrial tracking area" may be used interchangeably to refer to a region defined by selected terrestrial (e.g., earth-fixed) boundaries. In this regard, an earth-fixed tracking area, a terrestrial tracking area, or both, may refer to a defined region on Earth defined by a selected geofenced boundary. The boundaries of an earth-fixed tracking area may be independent of one or more boundaries of one or more cells of an NTN, in some cases.

Aspects of the present disclosure enable the UE to select which paging resources to monitor, thereby reducing a paging load at the UE. In some aspects, the UE may determine that a cell serves two or more earth-fixed tracking areas based on a received system information broadcast (SIB) message including tracking area indicators associated with a first earth-fixed tracking area and a second earth-fixed tracking area. In some aspects, the UE may determine which paging resources to monitor based on its geographical position or based on a previous association with the first earth-fixed tracking area or a second earth-fixed tracking area. Additionally, the UE may monitor the paging resources associated with the selected earth-fixed tracking area using a paging radio temporary network identifier (P-RNTI) associated with the selected earth-fixed tracking area. Alternatively, the UE may monitor the paging resources associated with the selected earth-fixed tracking area based on received downlink control information (DCI) which indicates whether a paging occasion (e.g., paging message) is associated with the selected earth-fixed tracking area.

Aspects of the disclosure are initially described in the context of wireless communications systems. Aspects of the disclosure are also illustrated by an example process flow diagram. Aspects of the disclosure are further illustrated by and described with reference to apparatus diagrams, system diagrams, and flowcharts that relate to change of tracking area code (TAC) for wireless networks.

FIG. 1 illustrates an example of a wireless communications system 1d that supports change of TAC for wireless networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 155 (e.g., via an S1, N2, N3, or other interface). The base stations 105 may communicate with one another over the backhaul links 155 (e.g., via an X2, Xn, or other interface) either directly (e.g., directly between base stations 105), or indirectly (e.g., via core network 130), or both. In some examples, the backhaul links 155 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. In some aspects, the UEs 115 may include a UE communications manager 101 which is configured to support wireless communications at the respective UEs 115. In particular, the UE communications manager 101 may be configured to support change of TAC for wireless networks, as described herein. The UE communications manager 101 may include one or more processors configured to execute code in a memory. The UE communications manager 101 illustrated in FIG. 1 may include, or may be an example of, the communications manager 515, communications manager 615, communications manager 710, communications manager 810, or any combination thereof.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. Satellite 120 may communicate with base stations 105 (also referred to as gateways in NTNs) and UEs 115 (or other high altitude or terrestrial communications devices). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, and the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of an NTN. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, modulating the signal to be transmitted, or a combination thereof. For example, a bent-pipe satellite (e.g., satellite 120) may receive a signal from a base station 105 and may relay the signal to a UE 115 or base station 105, or vice-versa.

In some aspects, the satellites 120 may include a satellite communications manager 102 which is configured to support wireless communications at the respective satellites 120. In particular, the satellite communications manager 102 may be configured to support change of TAC for wireless networks, as described herein. The satellite communications manager 102 may include one or more processors configured to execute code in a memory. The satellite communications manager 102 illustrated in FIG. 1 may include, or may be an example of, the communications manager 915, communications manager 1015, communications manager 1110, communications manager 1210, or any combination thereof.

The UEs 115 and the base stations 105/satellites 120 may support communications to enable change of tracking areas for wireless networks (e.g., NTNs). In some aspects, a satellite 120 may transmit a control message (e.g., SIB message) associated with a first cell of the satellite 120. The control message (e.g., SIB message) may include a first earth-fixed tracking area indicator (e.g., first TAC) associated with a first earth-fixed tracking area served by the first cell, and a second earth-fixed tracking area indicator (e.g., second TAC) associated with a second earth-fixed tracking area served by the first cell. In some aspects, a UE 115 may determine that the first cell of the satellite 120 serves the first earth-fixed tracking area and the second earth-fixed tracking area based on the received control message. Additionally or alternatively, the UE 115 may determine that the first cell serves the first earth-fixed tracking area and the second earth-fixed tracking area based on a control message or DCI received from the satellite 120.

Upon determining that the first cell of the satellite 120 serves both the first earth-fixed tracking area and the second earth-fixed tracking area, the UE 115 may determine to monitor paging resources associated with the first earth-fixed tracking area or the second earth-fixed tracking area, and may subsequently monitor the paging resources associated with the selected earth-fixed tracking area. In some aspects, the UE 115 may determine the first cell serves two or more earth-fixed tracking areas and/or monitor the selected paging resources associated with the first earth-fixed tracking area and/or the second earth-fixed tracking area while operating in a radio resource control (RRC) idle mode of operation. In some aspects, the UE 115 may determine which paging resources to monitor based on the geographical position of the UE 115 within the first earth-fixed tracking area or the second earth-fixed tracking area. Additionally or alternatively, the UE 115 may determine which paging resources to monitor based on a previous association with the first earth-fixed tracking area or the second earth-fixed tracking area. Additionally, the UE 115 may monitor the paging resources associated with the selected earth-fixed tracking area by monitoring a paging message or paging occasion associated with the selected earth-fixed tracking area using a P-RNTI associated with the selected earth-fixed tracking area. For the purposes of the present disclosure, the terms "paging message" and "paging occasion" may be used interchangeably, unless noted otherwise herein.

Figure 2:
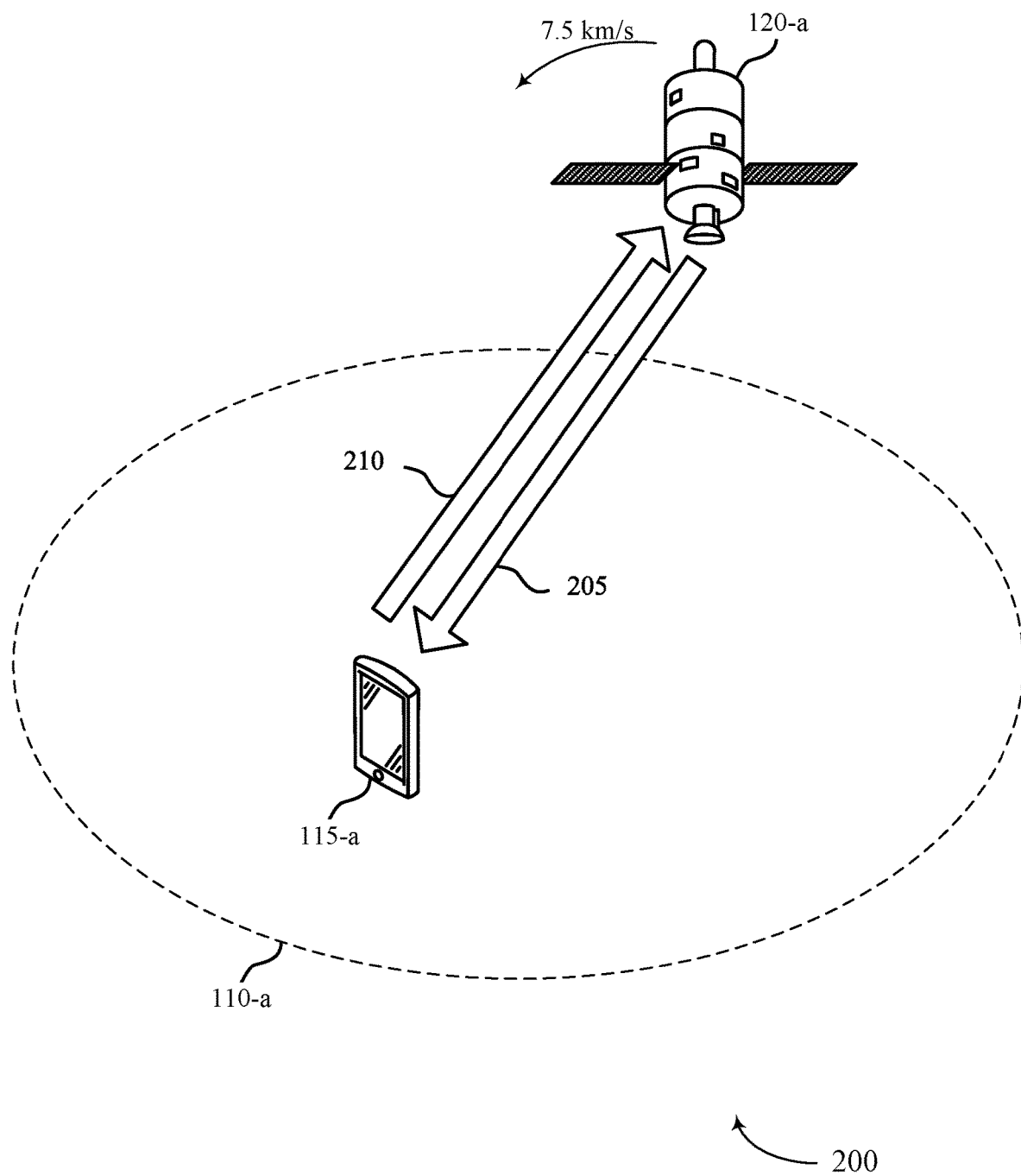
FIG. 2 illustrates an example of a wireless communications system that supports change of for wireless networks in accordance with aspects of the present disclosure.

FIG. 2 illustrates an example of a wireless communications system 200 that supports change of TAC for wireless networks in accordance with aspects of the present disclosure. In some examples, wireless communications system 200 may implement aspects of wireless communications system 100. Wireless communications system 200 may include a UE 115-a, and a satellite 120-a (e.g., which in some cases may also be referred to as a base station 105), which may be examples of a base station 105, UEs 115, and satellites 120 as described with reference to FIG. 1. The satellite 120-a may serve a coverage area 110-a in cases of an NTN.

The wireless communications system 200 may support transmissions between the UE 115-a and the satellite 120-a. For example, UE 115-a may transmit an uplink transmission 210 to the satellite 120-a. Conversely, by way of another example, the satellite 120-a may transmit a downlink transmission 205 to the UE 115-a. The satellite 120-a may be in an orbit, such as low earth orbit, medium earth orbit, geostationary earth orbit, or other non-geostationary earth orbit. In any of these examples, the satellite 120-a may be many thousands of kilometers from Earth, and therefore may be thousands of kilometers from the UE 115-a. Each communication (e.g., downlink transmission 205, uplink transmission 210) between the satellite 120-a the UE 115-a may therefore travel from Earth the distance to the satellite 120-a and back to Earth.

In some aspects, the coverage area 110-a of the satellite 120-a may be significantly larger than coverage areas associated with terrestrial base stations (e.g., base station 105-a). In this regard, the coverage area 110-a may serve multiple earth-fixed tracking areas (e.g., multiple terrestrial tracking areas). The coverage area 110-a of the satellite may be sub-divided up into a plurality of cells which serve the earth-fixed tracking areas of the coverage area 110-a. As noted previously herein, the terms "earth-fixed tracking area" and "terrestrial tracking area" may be used interchangeably to refer to a region defined by selected earth-fixed (e.g., terrestrial) boundaries. In this regard, an earth-fixed tracking area may refer to a defined region on Earth defined by a selected geofenced boundary. The boundaries of a earth-fixed tracking area may be independent of one or more boundaries of one or more cells of an NTN, in some cases.

The satellite 120-a may move or travel relative to fixed positions on Earth (e.g., move relative to earth-fixed tracking areas). For example, when the satellite 120-a is in a low-earth orbit, the satellite 120-a may be between 600 km to 2000 km from Earth and travelling at a rate of 7.5 km/s. Therefore, the satellite 120-a and coverage area 110-a served by the satellite 120-a may move relative to Earth over time. Accordingly, UE 115-a may be located within and served by varying cells making up the coverage area 110-a of the satellite over time as the satellite 120-a moves relative to the UE 115-a. For example, in cases where the UE 115-a remains in a fixed location within a given earth-fixed tracking area, the UE 115-a may experience changing cell coverage as the satellite 120-a, coverage area 110-a, and cells of the coverage area 110-a move relative to the UE 115-a over time.

Accordingly, the wireless communications system 200 may be configured to support transmissions between the UE 115-a and the satellite 120-a in order to address these issues. In particular, the UE 115-a and/or the satellite 120-a may be configured to determine that a cell within the coverage area 110-a of the satellite 120-a which is serving the UE 115-a is serving two or more earth-fixed tracking areas. The UE 115-a and/or the satellite 120-a may then be configured to monitor paging resources associated with a selected earth-fixed tracking area served by the cell based at least in part on determining that the cell serves the two or more earth-fixed tracking areas. In some aspects, the UE 115-a may determine the cell serves two or more earth-fixed tracking areas and/or monitor the selected paging resources associated with the first earth-fixed tracking area and/or the second earth-fixed tracking area while operating in an RRC idle mode of operation. By determining that the cell serves two or more earth-fixed tracking areas, and by monitoring paging resources based on that determination, the wireless communications system 200 may reduce a paging load at the UE 115-a and prevent unnecessary registration procedures.

Figure 3:
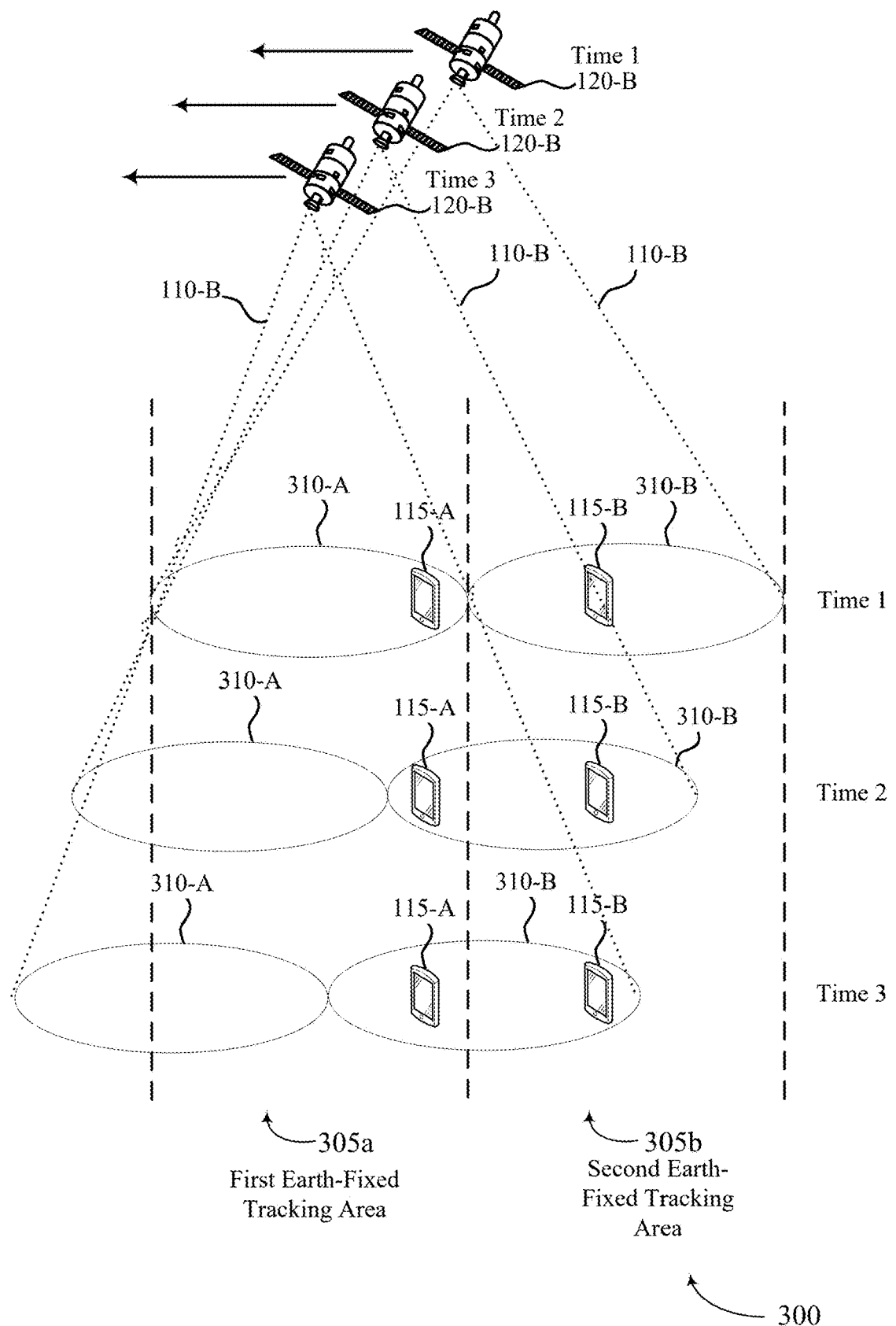
FIG. 3 illustrates an example of a wireless communications system that supports change of TAC for wireless networks in accordance with aspects of the present disclosure.

FIG. 3 illustrates an example of a wireless communications system 300 that supports change of TAC for wireless networks in accordance with aspects of the present disclosure. In some examples, wireless communications system 300 may implement aspects of wireless communications system 100 and/or wireless communications system 200. Generally, FIG. 3 illustrates one or more aspects of the disclosure that enable change of TACs for wireless networks (e.g., NTNs).

The wireless communications system 300 may include a satellite 120-b which serves a first UE 115-a and a second UE 115-b. The first UE 115-a may be positioned within a first earth-fixed tracking area 305-a (e.g., first terrestrial tracking area), where the second UE 115-b may be positioned within a second earth-fixed tracking area 305-b (e.g., second terrestrial tracking area) different from the first earth-fixed tracking area 305-a. As noted previously herein, the first earth-fixed tracking area 305-a and the second earth-fixed tracking area 305-b may include regions defined by selected terrestrial boundaries (e.g., selected geofenced areas). In this regard, the first earth-fixed tracking area 305-a and the second earth-fixed tracking area 305-b may be stationary relative to Earth and relative to one another. For example, the first earth-fixed tracking area 305-a may be defined by a first geofenced boundary, and the second earth-fixed tracking area 305-b may be defined by a second geofenced boundary which shares one or more boundary edges with the first earth-fixed tracking area 305-a. In this example, the first earth-fixed tracking area 305-a and the second earth-fixed tracking area 305-b may be positioned adjacent to one another.

In some aspects, the first earth-fixed tracking area 305-a and the second earth-fixed tracking area 305-b may be disposed within a coverage area 110-b of the satellite 120-b. The coverage area 110-b of the satellite 120-b may include a plurality of cells which make up the coverage area 110-b. For example, the satellite 120-b may include a first cell 310-a and a second cell 310-b. The coverage area 110-b of the satellite 120-b may include any number of cells which span any number of earth-fixed tracking areas. As such, the first cell 310-a and the second cell 310-b are illustrated in FIG. 3 solely for illustrative purposes.

In some aspects, the satellite 120-b may move relative to the Earth over time. Accordingly, the satellite 120-b may also move relative to the first earth-fixed tracking area 305-a and the second earth-fixed tracking area 305-b over time. For example, as shown in FIG. 3, the satellite 120-b may be located at a first position at Time 1, at a second position at Time 2, and a third position at Time 3. In this example, Time 2 is subsequent to Time 1, and Time 3 is subsequent to Time 2 such that the satellite 120-b is illustrated as moving from right to left across the page over time. Additionally, the coverage area 110-b served by the satellite 120-b may also move relative to the Earth and the earth-fixed tracking areas 305-a, 305-b over time as the satellite 120-b moves relative to the Earth. For example, at Time 1, the coverage area 110-b may be positioned such that the first cell 310-a serves the first earth-fixed tracking area 305-a, and the second cell serves the second earth-fixed tracking area 305-b. At Time 2, the coverage area 110-b may have shifted relative to Earth such that the first cell 310-a continues to serve at least a portion of the first earth-fixed tracking area 305-a, and the second cell serves at least a portion of the second earth-fixed tracking area 305-b and at least a portion of the first earth-fixed tracking area 305-a. In this regard, at Time 2, the second cell 310-b serves both the first earth-fixed tracking area 305-a and the second earth-fixed tracking area 305-b. Continuing with the same example, at Time 3, the coverage area 110-b may have shifted relative to Earth such that the first cell 310-a continues to serve at least a portion of the first earth-fixed tracking area 305-a, and the second cell serves at least a portion of the second earth-fixed tracking area 305-b and at least a portion of the first earth-fixed tracking area 305-a.

In the case of NTNs including a satellite 120-b which move relative to Earth, a UE 115-a, 115-b may experience changing cell coverage as the satellite 120-b moves relative to Earth. For example, as illustrated in FIG. 3, the first UE 115-a and the second UE 115-b may remain stationary over time within the first earth-fixed tracking area 305-a and the second earth-fixed tracking area 305-b, respectively. The second UE 115-b may be disposed within the second cell 310-b such that the second cell 310-b serves the second UE 115-b at Time 1, Time 2, and Time 3. Comparatively, the first UE 115-a may be disposed within the first cell 310-a at Time 2, and may be disposed within the second cell 310-b at Time 2 and Time 3. In this regard, the first UE 115-a may experience changing cell coverage over time despite remaining stationary within the first earth-fixed tracking area 305-a due to the mobility of the satellite 120-b and corresponding coverage area 110-b. The changing cell coverage may require the UE 115-a and the satellite 120-b to perform a handover procedure from the first cell 310-a to the second cell 310-b between Time 1 and Time 2 as the first UE 115-a experiences changing cell coverage.

The UEs 115-a, 115-b may not be stationary in all scenarios. For example, the first UE 115-a may move from the first earth-fixed tracking area 305-a to the second earth-fixed tracking area 305-b. In this example, the UE 115-a may acquire a control message (e.g., SIB message) associated with the second earth-fixed tracking area 305-b such that may monitor paging resources associated with the second earth-fixed tracking area 305-b.

One challenge associated with the changing cell coverage experienced by the first UE 115-a in FIG. 3 is the paging load at the first UE 115-a. In particular, at Time 2 and Time 3, the second cell 310-a serves both the first earth-fixed tracking area 305-a and the second earth-fixed tracking area 305-b, and may transmit paging messages associated with both the first earth-fixed tracking area 305-a and the second earth-fixed tracking area 305-b. However, it is undesirable for the first UE 115-a to monitor both paging messages associated with both first earth-fixed tracking area 305-a and the second earth-fixed tracking area 305-b, as the increased paging load may unduly increase power consumption at the first UE 115-a. Additionally, NTNs which serve stationary UEs (e.g., first UE 115-a) may result in changing cell coverage, thereby triggering unnecessary registration procedures. In this regard, there is a tradeoff between designating smaller cells 310-a, 310-b, which may result in frequent handover and tracking area update (TAU) procedures, and designating larger cells 310-a, 310-b, which may result in large paging loads within the coverage area 110-b of the satellite 120-b.

Accordingly, in some aspects of the disclosure, wireless communications system 300 may support communications between UE 115-a, 115-b which enable proper management of a paging load at the UE 115-a, 115-b, allow for efficient handling of earth-fixed tracking area lists, and prevent unnecessary registration procedures.

An example may prove to be illustrative. At Time 1, the first UE 115-a may be disposed within the first earth-fixed tracking area 305-a and may communicate with the satellite 120-b via the first cell 310-a. Similarly, the second UE 115-b may be disposed within the second earth-fixed tracking area 305-b and may communicate with the satellite 120-b via the second cell 310-b. In some aspects, the satellite 120-b may transmit a control message to the UEs 115-a, 115-b including tracking area indicators associated with each cell 310-a, 310-b. In some cases, a control message may be an example of a SIB message or any other RRC message or other control message. For example, at Time 1, the satellite 120-b may transmit a SIB message associated with the first cell 310-a to the first UE 115-a, where the SIB message includes a tracking area indicator (e.g., TAC) associated with the first earth-fixed tracking area 305-a. By way of another example, at Time 1, the satellite 120-b may transmit a SIB message associated with the second cell 310-b to the second UE 115-b, where the SIB message includes a tracking area indicator (e.g., TAC) associated with the second earth-fixed tracking area 305-b.

In some cases, the satellite 120-b may transmit (e.g., broadcast) system information (e.g., SIB messages) which indicate that a cell 310 serves more than one earth-fixed tracking area 305. For example, in some cases, the satellite 120-b may transmit system information which includes an indication the first cell 310-a is associated with a first tracking area indicator (e.g., first TAC) associated with the first earth-fixed tracking area 305-a and a second tracking area indicator (e.g., second TAC) associated with the second earth-fixed tracking area 305-b. In this regard, the system information transmitted by the satellite 120-b may indicate that the first cell 310-a serves both the first earth-fixed tracking area 305-a and the second earth-fixed tracking area 305-b. In some aspects, system information (e.g., SIB messages) may include one or more fields (e.g., tracking area indicator fields, TAC fields) for indicating one or more tracking area indicators. For example, continuing with the example above, the system information may include a first tracking area indicator field and a second tracking area indicator field, where the first and second tracking area indicator fields are used to indicate the first and second tracking area indicators, respectively.

Subsequently, between Time 1 and Time 2, the first UE 115-a and the satellite 120-b may perform a handover procedure to establish a communication link between the first UE 115-a and the second cell 310-b of the satellite 120-b. Accordingly, at Time 2, the first UE 115-b may communicate with the second cell 310-b based at least in part on performing the handover procedure between Time 1 and Time 2. In some aspects, the first UE 115-a may transition to an RRC idle mode operation after performing the handover procedure and establishing the connection with the second cell 310-b.

In some aspects, the satellite 120-b may transmit a control message (e.g., SIB message) associated with the second cell 310-b including tracking area indicators (e.g., TACs) associated with both the first earth-fixed tracking area 305-a and the second earth-fixed tracking area 305-b. For example, at Time 2, the satellite 120-b may transmit a SIB message associated with the second cell 310-b to the first UE 115-a, where the SIB message includes a first tracking area indicator (e.g., first TAC) for the first earth-fixed tracking area 305-a and a second tracking area indicator (e.g., second TAC) for the second earth-fixed tracking area 305-b. In this regard, the SIB message may include two separate tracking area indicators which indicate that the second cell 310-b serves both the first earth-fixed tracking area 305-a and the second earth-fixed tracking area 305-b.

In some aspects, the SIB message including tracking area indicators for the first and second earth-fixed tracking areas 305-a, 305-b may include a temporary tracking area indicator or shorter validity indicator. Temporary tracking area indicators and shorter validity indicators may be used by the satellite 120-b to indicate that a given cell will be serving a given earth-fixed tracking area for only a given or limited amount of time. For the purposes of the present disclosure, the terms "temporary tracking area indicator" and "shorter validity indicator" may be used interchangeably to refer to an indicator which is valid for only a given or limited amount of time. In some aspects, the temporary tracking area indicator may be associated with the first earth-fixed tracking area 305-a and/or the second earth-fixed tracking are 305-b. For example, the SIB message associated with the second cell 310-b may include a tracking area indicator associated with the first earth-fixed tracking area 305-a, and a temporary tracking area indicator associated with the second earth-fixed tracking area 305-b. Conversely, by way of another example, the SIB message associated with the second cell 310-b may include a tracking area indicator associated with the second earth-fixed tracking area 305-b, and a temporary tracking area indicator associated with the first earth-fixed tracking area 305-a.

In some aspects, additional system information (e.g., master information block (MIB) messages) may include information associated with temporary tracking indicators. In particular, MIB messages may include indications as to whether system information (e.g., SIB messages) include information associated with temporary tracking area indicators. In this regard, MIB messages may instruct a UE 115 to check SIB messages for information associated with temporary tracking area indicators in cases where the UE 115 selects to monitor paging resources associated with a earth-fixed tracking area 305 associated with a temporary tracking area indicator.

For example, the first UE 115-a may receive a MIB message associated with the second cell 310-b, where the MIB message includes one or more fields associated with temporary tracking area indicators. In this example, the one or more fields within the MIB message may indicate whether system information (e.g., SIB messages) associated with the second cell 310-b include data associated with temporary tracking area indicators. The first UE 115-a may additionally receive system information associated with the second cell 310-b, and may check the system information for data associated with temporary tracking area indicators based on the MIB message. In some aspects, the UEs 115-a, 115-b may be configured to store tracking area indicators in a tracking area indicator list of the UE 115-a, 115-b. For example, upon receiving the control message (e.g., system information, SIB message) at Time 2, the first UE 115-a may be configured to store the first tracking area indicator associated with the first earth-fixed tracking area 305-a and the second tracking area indicator associated with the second earth-fixed tracking area 305-b in a tracking area indicator list of the first UE 115-a.

The control message (e.g., system information, SIB message) associated with the second cell 310-b which is transmitted by the satellite 120-b to the first UE 115-a may include a validity time associated with a temporary tracking area indicator (e.g., TAC). The validity time may include an indication of the amount of time that the second cell 310-b will be serving the given earth-fixed tracking area 305-a, 305-b associated with the temporary tracking area indicator. For example, in cases where the SIB includes a tracking area indicator associated with the second earth-fixed tracking area 305-b, and a temporary tracking area indicator associated with the first earth-fixed tracking area 305-a, the SIB message may further include a validity time associated with the temporary tracking area indicator of the first earth-fixed tracking area 305-a.

In some aspects, the first UE 115-a may be configured to remove the temporary tracking area indicator from the tracking area indicator of the first UE 115-a upon expiration of the validity time of the temporary tracking area indicator. For example, continuing with the example above, the first UE 115-a may be configured to remove the temporary tracking area indicator associated with the first earth-fixed tracking area 305-a from the tracking area indicator list of the first UE 115-a upon expiration of the validity time associated with the temporary tracking area indicator. Similarly, in other aspects, the satellite 120-b may remove the temporary tracking are indicator from SIB messages after expiration of the validity time. In this regard, SIB messages (and/or control messages) transmitted after expiration of the validity time may omit the temporary tracking area indicator. It is contemplated herein that the validity time may be broadcast (e.g., broadcast via SIB messages), preconfigured within the wireless communications system 300, and/or pre-defined.

In some aspects, the first UE 115-*a* and the satellite 120-*b* may be configured to determine that the second cell 310-*b* serves both the first earth-fixed tracking area 305-*a* and the second earth-fixed tracking area 305-*b*. For example, at Time 2, the satellite 120-*b* and the first UE 115-*a* may be configured to determine that the second cell 310-*b* serves both the first earth-fixed tracking area 305-*a* and the second earth-fixed tracking area 305-*b*. In some aspects, the satellite 120-*b* may transmit the control message upon determining that the second cell 310-*b* serves the first and second earth-fixed tracking areas 305-*a*, 305-*b*. In some aspects, the first UE 115-*a* may be configured to determine that the second cell 310-*b* serves the first and second earth-fixed tracking areas 305-*a*, 305-*b* based at least in part on a received control message (e.g., system information, SIB message). In particular, the presence of multiple tracking area indicators (e.g., multiple TACs) may indicate to the given UE 115-*a*, 115-*b* that the given cell 310-*a*, 310-*b* serves multiple earth-fixed tracking areas 305-*a*, 305-*b*. For example, upon receiving a SIB message associated with the second cell 310-*b* including a first tracking area indicator (e.g., first TAC) associated with the first earth-fixed tracking area and a second tracking area indicator (e.g., second TAC) associated with the second earth-fixed tracking area, the first UE 115-*a* may be configured to determine that the second cell 310-*b* serves both the first and second earth-fixed tracking areas 305-*a*, 305-*b*.

In additional or alternative aspects, the first UE 115-*a* may be configured to determine the second cell 310-*b* serves the first and second earth-fixed tracking areas 305-*a*, 305-*b* without receiving a control message (e.g., new SIB message) associated with the second cell 310-*b*. For example, in some cases, the first UE 115-*a* may be pre-configured by dedicated RRC signaling such that it does not need to receive a SIB message associated with the second cell 310-*b*. For instance, the first UE 115-*a* may receive an RRC message prior to determining that second cell 310-*b* serves the first and second earth-fixed tracking areas 305-*a*, 305-*b*. In this example, the first UE 115-*a* may determine that it has a valid version of a SIB message associated with the second cell 310-*b* stored within the first UE 115-*a*, and may therefore determine that second cell 310-*b* serves both the first and second earth-fixed tracking areas 305-*a*, 305-*b* based on the received RRC message and/or the valid version of the SIB message associated with the second cell 310-*b*.

It is noted herein that the second UE 115-*a* may or may not determine that the second cell 310-*b* serves both the first and second earth-fixed tracking areas 305-*a*, 305-*b*. For example, in some aspects, the second UE 115-*a* may acquire/receive a SIB message associated with the second cell 310-*b* from the satellite 120-*b*, where the SIB message includes a first tracking area indicator associated with the first earth-fixed tracking area 305-*a*, and a second tracking area indicator associated with the second earth-fixed tracking area 305-*b*. In this example, the second UE 115-*b* may be configured to determine that the second cell 310-*b* serves both the first and second earth-fixed tracking areas 305-*a*, 305-*b* based at least in part on the SIB message. By way of another example, in cases where the second UE 115-*b* does not acquire/receive a new SIB message of the second cell 310-*a*, the second UE 115-*b* may not be aware that the second cell 310-*b* is now also serving the first earth-fixed tracking area 305-*a*. In this example, the second UE 115-*b* may simply assume that it still belongs to (e.g., is disposed within) the second earth-fixed tracking area 305-*b*, and may continue monitoring paging resources associated with the second earth-fixed tracking area 305-*b* as it was at Time 1.

In some aspects, the first UE 115-*a* may be configured to report earth-fixed tracking areas 305 and/or tracking area indicators to a non-access stratum (NAS) of the first UE 115-*a*. For example, upon receiving a control message (e.g., SIB message) including the first tracking area indicator associated with the first earth-fixed tracking area 305-*a* and the second tracking area indicator associated with the second earth-fixed tracking area 305-*b*, the first UE 115-*a* may be configured to report the first earth-fixed tracking area 305-*a* (or first tracking area indicator) and the second earth-fixed tracking area 305-*b* (or second tracking area indicator) to the NAS of the first UE 115-*a*. The first UE 115-*a* may report the first and second earth-fixed tracking areas 305-*a*, 305-*b* (and/or first and second tracking area indicators) to the NAS of the first UE 115-*a* in order to determine whether a registration update is required. Accordingly, the first UE 115-*a* may be configured to determine whether or not to perform a registration update based at least in part on the first tracking area indicator associated with the first earth-fixed tracking area 305-*a* and the second tracking area indicator associated with the second earth-fixed tracking area 305-*b*.

In some aspects, the first UE 115-*a* may be configured to determine that the first UE 115-*a* will monitor the paging resources associated with the first earth-fixed tracking area 305-*a* and/or paging resources associated with the second earth-fixed tracking area 305-*b*. It is noted herein that monitoring paging resources of multiple earth-fixed tracking areas 305-*a*, 305-*b* may result in a large paging load and therefore large power consumption at the UE 115-*a*, 115-*b*, and may therefore be undesirable in some circumstances. In this regard, the first UE 115-*a* may be configured to determine to monitor either paging resources associated with the first earth-fixed tracking area 305-*a* or paging resources associated with the second earth-fixed tracking area 305-*b* in order to reduce paging load and power consumption at the first UE 115-*a*. For example, in some cases, the first UE 115-*a* may determine to monitor paging resources associated with the first earth-fixed tracking area 305-*a*. However, it is further noted herein that there may be instances in which it may be beneficial for the first UE 115-*a* to monitor paging resources associated with both the first and second earth-fixed tracking areas 305-*a*, 305-*b*. In some aspects, the selection to monitor paging resources associated with the first and/or second earth-fixed tracking areas 305-*a*, 305-*b* may be based at least in part on determining that the second cell 310-*b* serves the first earth-fixed tracking area 305-*a* and the second earth-fixed tracking area 305-*b*.

In some aspects, the first UE 115-*a* may be configured to monitor paging resources of a selected earth-fixed tracking area 305-*a*, 305-*b* based on a position of the first UE 115-*a* within a given earth-fixed tracking area 305-*a*, 305-*b*. For example, the first UE 115-*a* may be configured to determine a terrestrial location of the first UE 115-*a*. In this regard, the first UE 115-*a* may be configured to determine that the first UE 115-*a* is positioned within the first earth-fixed tracking area 305-*a* based on the determined terrestrial location. Subsequently, the first UE 115-*a* may monitor paging resources associated with the first earth-fixed tracking area 305-*a* based at least in part on the determined terrestrial location of the first UE 115-*a* within the first earth-fixed tracking area 305-*a*. It is contemplated herein that the first UE 115-a may be configured to determine its terrestrial location (e.g., terrestrial position) using any components or techniques known in the art. For example, the first UE 115-a may be configured to determine its terrestrial location (e.g., terrestrial position) using a global positioning system (GPS) component, a global navigation satellite system (GNSS) component, a position manager (e.g., position manager 730), and the like.

Similarly, in some implementations, the UEs 115 may be configured to determine/select which paging resources to monitor (e.g., paging resources of the first earth-fixed tracking area 305-a or the second earth-fixed tracking area 305-b) based on boundary information (e.g., geographical boundary information) associated with the respective earth-fixed tracking areas 305. In particular, the UEs 115 may be configured to determine/select which paging resources to monitor based on a boundary information associated with earth-fixed tracking areas 305 corresponding to temporary tracking area indicators (e.g., temporary TACs).

For example, the UE 115-a may receive system information which indicates that the second cell 310-b is associated with a tracking area indicator associated with the first earth-fixed tracking area 305-a and a temporary tracking area indicator associated with the second earth-fixed tracking area 305-b. The system information may further include an indication of boundary information (e.g., geographical boundary information) associated with the second earth-fixed tracking area 305-b corresponding to the temporary tracking area indicator. In this example, the UE 115-a may determine/select to monitor paging resources associated with the first or second earth-fixed tracking area 305 based on the boundary information. In some cases, the UE 115-a may determine/select to monitor paging resources associated with the first or second earth-fixed tracking area 305 based on both the boundary information and a determined location (e.g., geographical location) of the UE 115-a relative to the boundary information. In some aspects, system information may include boundary information associated with each earth-fixed tracking area 305 (e.g., each tracking area indicator), including earth-fixed tracking areas 305 associated with non-temporary tracking area indicators, temporary tracking area indicators, or both.

In cases where system information (e.g., SIB message) indicates that a cell 310 serves more than one earth-fixed tracking area 305, where one of the cells 310 is associated with a temporary tracking area indicator, the UE 115-a may determine which paging resources to monitor (e.g., paging resources of the first earth-fixed tracking area 305-a or the second earth-fixed tracking area 305-b) based on a validity time associated with the temporary tracking area indicator.

For example, the first UE 115-a may receive system information which indicates that the second cell 310-b is associated with a tracking area indicator associated with the first earth-fixed tracking area 305-a and a temporary tracking area indicator associated with the second earth-fixed tracking area 305-b. The system information may further indicate a validity time associated with the temporary tracking area indicator. In this regard, the system information may indicate that the second cell 310-b will only serve the second earth-fixed tracking area 305-b for a duration of the validity time. In this example, the first UE 115-a may compare the validity time to a threshold validity time, and may determine/select to monitor paging resources associated with the first earth-fixed tracking area 305-a based on whether the validity time satisfies the threshold validity time. In particular, the first UE 115-a may determine/select to monitor paging resources associated with the first earth-fixed tracking area 305-a based on the validity time being less than or equal to the threshold validity time. In other words, the UE 115-a may determine/select to monitor paging resources associated with the first earth-fixed tracking area 305-a which will be valid for a longer duration of time. By doing so, the UE 115-a may camp on the second cell 310-b serving the first earth-fixed tracking are 305-a for a longer duration of time.

In additional or alternative aspects, the first UE 115-a may determine which paging resources to monitor without determining its terrestrial location and/or boundary information. For example, the first UE 115-a may be configured to determine that it was associated with the first earth-fixed tracking area 305-a prior to the second cell 310-b serving both the first and second earth-fixed tracking areas 305-a, 305-b (e.g., at Time 1), and may therefore select to monitor paging resources of the first earth-fixed tracking area 305-a based on that previous association. In this example, the first UE 115-a may simply determine it was previously associated with the first earth-fixed tracking area 305-a (e.g., was previously positioned within the first earth-fixed tracking area 305-a), may assume it is still associated with the first earth-fixed tracking area 305-a (e.g., still positioned within the first earth-fixed tracking area 305-a), and may therefore continue to monitor paging resources associated with the first earth-fixed tracking area 305-a.

In some implementations, temporary tracking area indicators may applicable to (e.g., usable by) any UE 115, whether or not the respective UEs 115 were previously associated with a cell 310 of the temporary tracking area indicator or not. In other implementations, temporary tracking area indicators may applicable to (e.g., usable by) UEs 115 which are continuing to operate within the cell 310 associated with the respective temporary tracking area indicator (e.g., UEs 115 which were last camped on the cell 310), but may be inapplicable to (e.g., not usable by) UEs 115 which are selecting the respective cell 310 as a new cell 310. In this regard, UEs 115 which are selecting the respective cell 310 as a new cell 310 may be configured to ignore (e.g., not use) the temporary tracking area indicator.

For example, at time T2, the first UE 115-a may receive system information associated with the second cell 310-b, where the system information includes a tracking area indicator associated with the first earth-fixed tracking area 305-a and a temporary tracking area indicator associated with the second earth-fixed tracking area 305-b. In this example, due to the fact that the first UE 115-a would be new to the second cell 310-b, the temporary tracking area indicator may be inapplicable to (e.g. unusable by) the first UE 115-a, and the first UE 115-a may select to monitor paging resources associated with the tracking area indicator associated with the first earth-fixed tracking area 305-a. In this regard, the first UE 115-a may select the tracking area indicator associated with the first earth-fixed tracking area 305-a based on its previous association with the first cell 310-a and/or the first earth-fixed tracking area 305-a.

Conversely, by way of another example, the second UE 115-b may receive system information at time T2 associated with the second cell 310-b, where the system information includes a tracking area indicator associated with the first earth-fixed tracking area 305-a and a temporary tracking area indicator associated with the second earth-fixed tracking area 305-b. In this example, due to the fact that the second UE 115-b was previously camped on the second cell 310-b and/or positioned within the second earth-fixed tracking area 305-b, the temporary tracking area indicator may be applicable to (e.g. usable by) the second UE 115-b. As such, the second UE 115-b may select to monitor paging resources associated with the tracking area indicator associated with the first earth-fixed tracking area 305-a, the temporary tracking area indicator associated with the second earth-fixed tracking area 305-b, or both. In this regard, the second UE 115-a may be able to select the temporary tracking area indicator associated with the second earth-fixed tracking area 305-b based on its previous association with the second cell 310-b and/or the second earth-fixed tracking area 305-b.

In some aspects, the first UE 115-a may monitor paging resources associated with a given earth-fixed tracking area 305-a, 305-b using a P-RNTI associated with the given earth-fixed tracking area 305-a, 305-b. For example, in some aspects, the satellite 120-b may transmit a SIB message associated with the second cell 310-b to the first UE 115-b. The SIB message may indicate a first P-RNTI associated with the first earth-fixed tracking area 305-a, and a second P-RNTI associated with the second earth-fixed tracking area 305-b, where the second P-RNTI is different from the first P-RNTI. In this example, in situations where the first UE 115-a has selected to monitor paging resources of the first earth-fixed tracking area 305-a, the first UE 115-a may be configured to monitor the paging resources associated with the first earth-fixed tracking area 305-a using the first P-RNTI associated with the first earth-fixed tracking area 305-a.

As noted previously herein with respect to temporary tracking area indicators, the satellite 120-b may transmit one or more temporary P-RNTIs associated with the first or second earth-fixed tracking area 305-a, 305-b. For example, in some aspects, the satellite 120-b may transmit a SIB message indicating a P-RNTI associated with the first earth-fixed tracking area 305-a, and a temporary P-RNTI associated with the second earth-fixed tracking area 305-b. Conversely, by way of another example, the satellite 120-b may transmit a SIB message indicating a P-RNTI associated with the second earth-fixed tracking area 305-b, and a temporary P-RNTI associated with the first earth-fixed tracking area 305-a. In some aspects, the SIB message may include a validity time associated with the temporary P-RNTI. In some aspects, the satellite 120-b may remove the temporary P-RNTI indication from SIB messages after expiration of the validity time. In this regard, SIB messages (and/or control messages) transmitted after expiration of the validity time may omit an indication of the temporary P-RNTI. In additional or alternative aspects, the first UE 115-a may be configured to monitor paging resources associated with a selected earth-fixed tracking area 305-a, 305-b based on DCI received from the satellite 120-b. For example, the satellite 120-b may transmit a DCI which includes an indication of whether a paging message is associated with the first earth-fixed tracking area 305-a or is associated with the second earth-fixed tracking area 305-b. For instance, the DCI transmitted by the satellite 120-b may include a first value of the indication for the paging message being associated with the first earth-fixed tracking area 305-a or a second value of the indication for the paging message being associated with the second earth-fixed tracking area 305-b (e.g., indication values of "1" or "0", or vis versa). In cases where the first UE 115-a has determined to monitor paging resources associated with the first earth-fixed tracking area 305-a, the first UE 115-a may monitor those selected paging resources based at least in part on the indication of paging message within the received DCI.

In some aspects, the UE 115-a may be configured to determine that a first paging message is associated with the first earth-fixed tracking area 305-a and that a second paging message is associated with the second earth-fixed tracking area 305-b based at least in part on receiving DCI. For example, the UE 115-a may receive DCI from the satellite 120-b, where the DCI includes an indication that a first paging message is associated with the first earth-fixed tracking are 305-a, and that a second paging message is associated with the second earth-fixed tracking area 305-b.

By way of another example, the satellite 120-b may transmit first DCI which includes an indication that a first a paging message is associated with the first earth-fixed tracking area 305-a, and may further transmit a second DCI which includes an indication that a second a paging message is associated with the second earth-fixed tracking area 305-b. In this example, the first UE 115-a may monitor paging resources associated with the selected earth-fixed tracking area 305-a, 305-b based at least in part on the first DCI or second DCI received from the satellite 120-b.

In some cases, the first UE 115-a may be configured to monitor selected paging resources associated with a given earth-fixed tracking area 305-a, 305-b based at least in part on determined paging messages (e.g., paging occasions) for the respective earth-fixed tracking area 305-a, 305-b. For example, the satellite 120-b may transmit a SIB message associated with the second cell 310-b to the first UE 115-a. In this example, the UE 115-b may be configured to determine a paging message for the first earth-fixed tracking area 305-a based at least in part on whether the first earth-fixed tracking area 305-a is indicated within the SIB message via a tracking area indicator or temporary tracking area indicator associated with the first earth-fixed tracking area 305-a. Upon determining the paging message for the first earth-fixed tracking area 305-a, the first UE 115-a may monitor the paging resources of the first earth-fixed tracking area 305-a based at least in part on the determined paging message.

Figure 4:
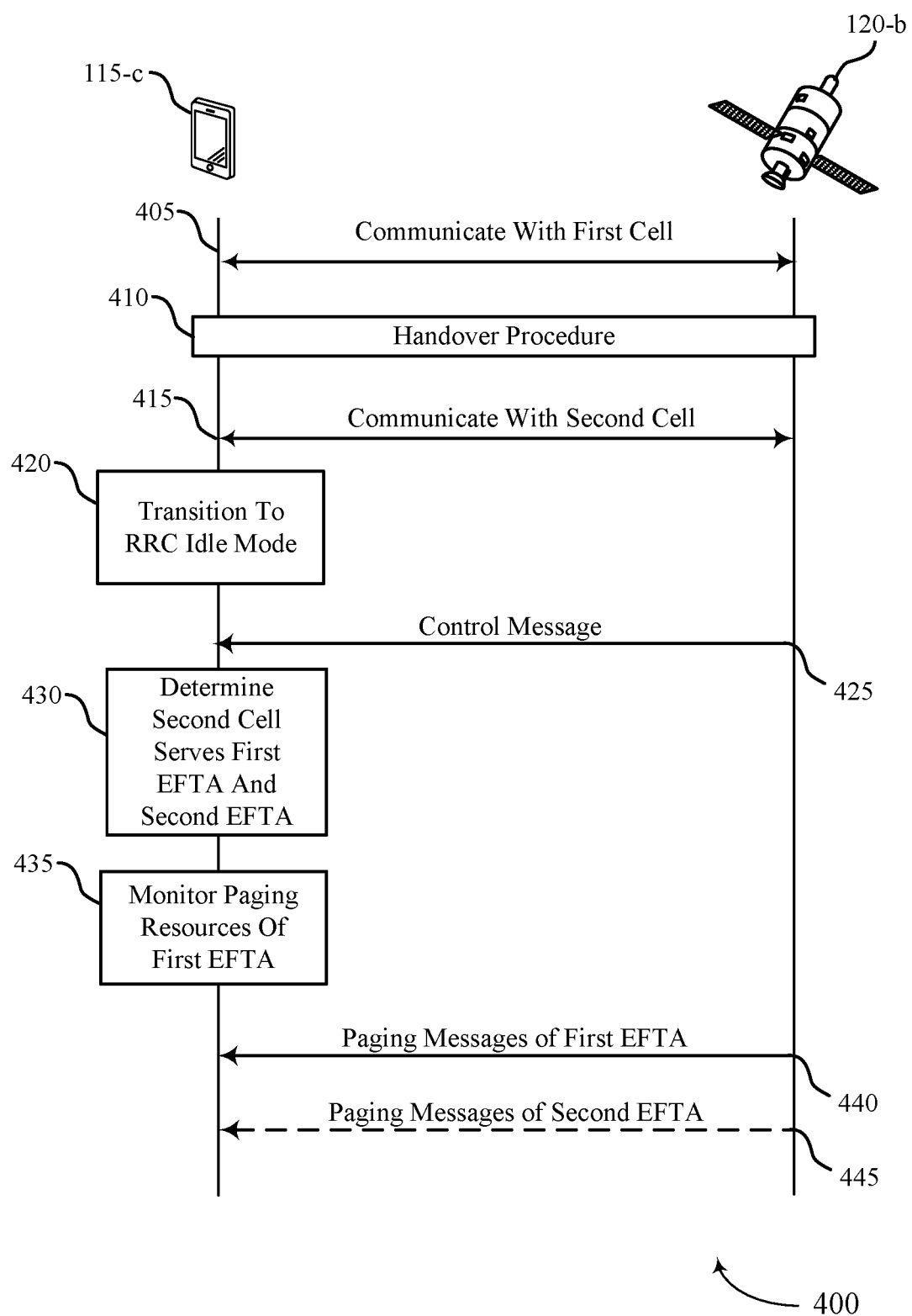
FIG. 4 illustrates an example of a process flow that supports change of TAC for wireless networks in accordance with aspects of the present disclosure.

FIG. 4 illustrates an example of a process flow 400 that supports change of TAC for wireless networks in accordance with aspects of the present disclosure. In some examples, process flow 400 may implement aspects of wireless communications system 100 and/or wireless communications system 200. For example, process flow 400 may illustrate changing TACs and monitoring paging resources within a wireless network, as described with reference to FIGS. 1-3.

The process flow 400 may include a satellite 120-b and a UE 115-c, which may be examples of a gNB (or base station 105) and a UE 115 as described with reference to FIGS. 1-3. For example, satellite 120-b may be an example of a satellite 120, as described herein. In the following description of the process flow 400, the operations between the satellite 120-b and the UE 115-c may be performed in a different order than the example order shown, or the operations performed by the satellite 120-b and the UE 115-c may be performed in different orders or at different times. Some operations may also be omitted from the process flow 400, and other operations may be added to the process flow 400. In the example of FIG. 4, the satellite 120-b and the UE 115-c may be in communication with each other via an NTN. The process flow 400 may support improved management of earth-fixed tracking area indicators (e.g., terrestrial tracking area indicators) and monitoring of paging resources within an NTN.

At 405, the UE 115-c and the satellite 120-b may communicate with one another via a first cell supported by the satellite 120-b. For example, as illustrated with respect to FIG. 2, the UE 115-c and the satellite 120-b illustrated in FIG. 4 may communicate with one another via a downlink transmission 205 and an uplink transmission 210.

At 410, the UE 115-c and the satellite 120-b may perform a handover procedure to establish a communication link between the UE 115-c and a second cell supported by the satellite 120-b.

At 415, the UE 115-c and the satellite 120-b may communicate with one another via the second cell first supported by the satellite 120-b. The communications between the UE 115-c and the second cell of the satellite 120-b may be based at least in part on performing the handover procedure.

At 420, the UE 115-b may transition to an RRC idle mode of operation. In some aspects, the UE 115-c may transition, the UE 115-b may transition to an RRC idle mode of operation to reduce power consumption. For example, after establishing a connection and communicating with the satellite 120-b via the second cell, the second cell may release the UE 115-c to the RRC idle mode of operation.

At 425, the satellite 120-b may transmit a control message (e.g., system information, SIB message) to the UE 115-c. In some aspects, the control message may include a first tracking area indicator associated with the first earth-fixed tracking area (e.g., first terrestrial tracking area), and a second tracking area indicator associated with the second earth-fixed tracking area (e.g., second terrestrial tracking area). For example, the satellite 120-b may transmit a SIB message associated with the second cell to the UE 115-c, where the SIB message includes a tracking area indicator associated with the first earth-fixed tracking area, and a second tracking area indicator associated with the second earth-fixed tracking area.

At 430, the UE 115-c may determine that the second cell serves the first earth-fixed tracking area and the second earth-fixed tracking area. In some aspects, the UE 115-c may be configured to determine that the second cell serves the first earth-fixed tracking area and the second earth-fixed tracking area based on the control message (e.g., system information) received at 425. For example, the UE 115-c may be configured to determine that the second cell serves the first earth-fixed tracking area and the second earth-fixed tracking area based on a SIB message received from the satellite 120-b, where the SIB message includes a first tracking area indicator associated with the first earth-fixed tracking area, and a second tracking area indicator associated with the second earth-fixed tracking area.

In additional or alternative aspects, the UE 115-c may be configured to determine the second cell 310-b serves the first and second earth-fixed tracking areas without receiving a control message (e.g., a new SIB message) associated with the second cell. For example, in some cases, the UE 115-c may be pre-configured by dedicated RRC signaling such that it does not need to receive a SIB message associated with the second cell. For instance, the UE 115-c may receive an RRC message prior to determining that second cell serves the first and second earth-fixed tracking areas. In this example, the UE 115-c may determine that it has a valid version of a SIB message associated with the second cell stored within the UE 115-c, and may therefore determine that second cell serves both the first and second earth-fixed tracking areas based on the received RRC message and/or the valid version of the SIB message associated with the second cell.

At 435, the UE 115-c may monitor paging resources associated with the first earth-fixed tracking area. In some aspects, the UE 115-c may be configured to monitor paging resources associated with the first earth-fixed tracking area based at least in part on the UE 115-c determining that the second cell serves the first earth-fixed tracking area and the second earth-fixed tracking area.

In some aspects, the first 115-c may monitor paging resources associated with a given earth-fixed tracking area using a P-RNTI associated with the given earth-fixed tracking area. For example, in some aspects, the satellite 120-b may transmit a SIB message associated with the second cell to the first UE 115-b. The SIB message may indicate a first P-RNTI associated with the first earth-fixed tracking area, and a second P-RNTI associated with the second earth-fixed tracking area, where the second P-RNTI is different from the first P-RNTI. In this example, in situations where the UE 115-c has selected to monitor paging resources of the first earth-fixed tracking area, the UE 115-c may be configured to monitor the paging resources associated with the first earth-fixed tracking area using the first P-RNTI associated with the first earth-fixed tracking area.

In cases where a respective cell associated with the control message (e.g., system information) received at 425 indicates that the cell is associated with a temporary tracking area indicator, the UE 115-c may select which paging resources to monitor based on a validity time associated with the temporary tracking area indicator. In particular, the UE 115-c may select which paging resources to monitor based on whether the validity time associated with the temporary tracking area indicator satisfies a threshold validity time. In other cases, the UE 115-c may select which paging resources to monitor based on a boundary information associated with the respective earth-fixed tracking area corresponding to the temporary tracking area indicator.

In additional or alternative aspects, the UE 115-c may be configured to monitor paging resources associated with a selected earth-fixed tracking area based on DCI received from the satellite 120-b. For example, the satellite 120-b may transmit a DCI which includes an indication of whether a paging message is associated with the first earth-fixed tracking area, the second earth-fixed tracking area, or both. For instance, the DCI transmitted by the satellite 120-b may include a first value of the indication for the paging message being associated with the first earth-fixed tracking area or a second value of the indication for the paging message being associated with the second earth-fixed tracking area (e.g., indication values of "1" or "0", or vis versa). By way of another example, the DCI transmitted by the satellite 120-b may include a first value of the indication for the paging message being associated with the first earth-fixed tracking area 305-a, a second value of the indication for the paging message being associated with the second earth-fixed tracking area, or a third value of the indication for the paging message being associated with the first second earth-fixed tracking area and the second earth-fixed tracking area. In cases where the UE 115-c has determined to monitor paging resources associated with the first earth-fixed tracking area, the UE 115-c may monitor those selected paging resources based at least in part on the indication of paging message within the received DCI.

By way of another example, the satellite 120-b may transmit first DCI which includes an indication that a first a paging message is associated with the first earth-fixed tracking area, and may further transmit a second DCI which includes an indication that a second a paging message is associated with the second earth-fixed tracking area. In this example, the UE 115-c may monitor paging resources associated with the selected earth-fixed tracking area based at least in part on the first DCI or second DCI received from the satellite 120-b.

At 440, the satellite 120-b may transmit paging messages associated with the first earth-fixed tracking area to the UE 115-c. In some cases, the UE 115-c may receive the paging messages associated with the first earth-fixed tracking area based at least in part on the UE 115-c monitoring the paging resources associated with the first earth-fixed tracking area.

At 445, the satellite 120-b may transmit paging messages associated with the second earth-fixed tracking area to the UE 115-c. It is noted herein that, in some cases, the UE 115-c may be configured to receive paging messages associated with the second earth-fixed tracking area despite the UE 115-c not monitoring for paging resources associated with the second earth-fixed tracking area.

Figure 5:
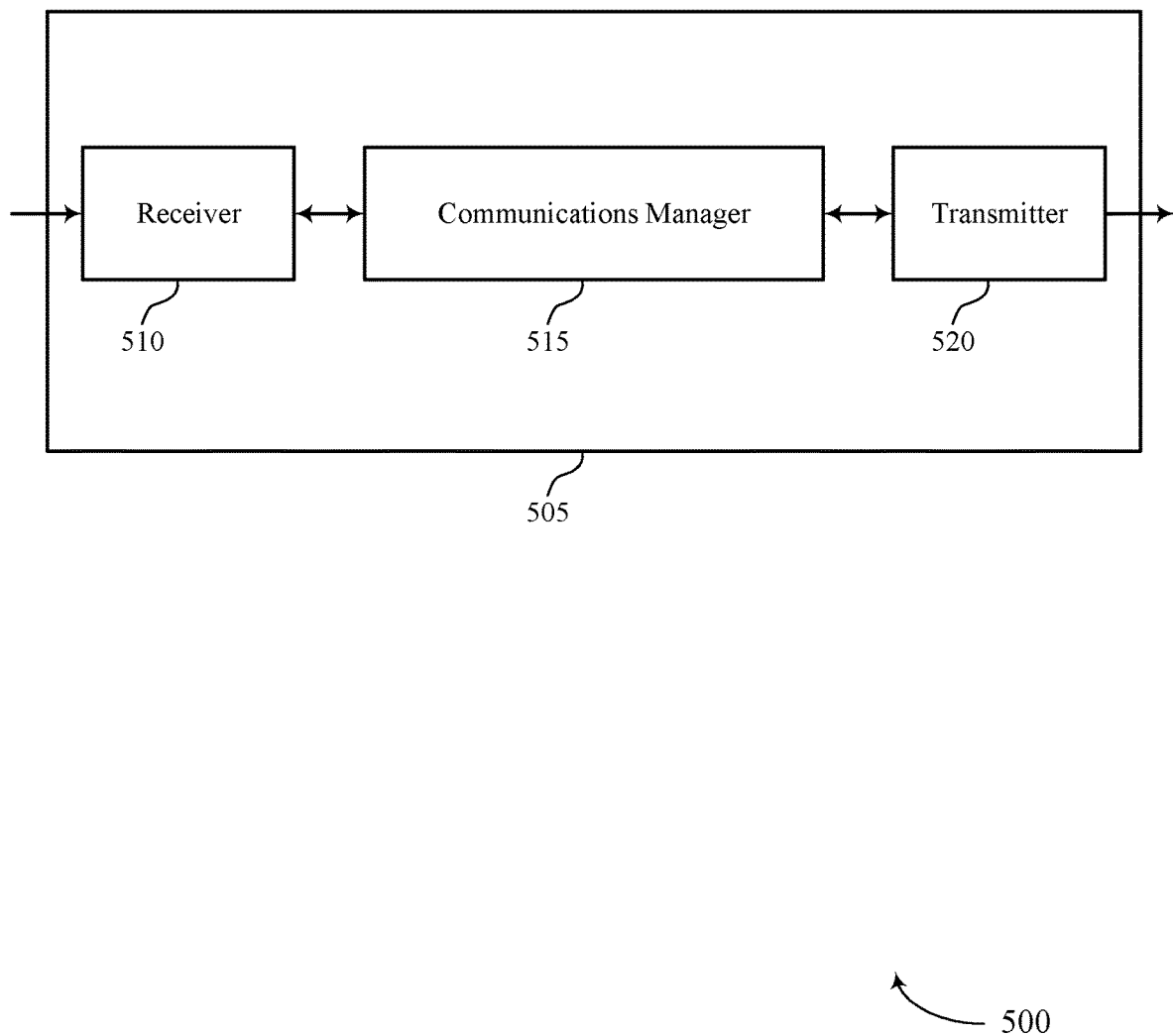
FIGS. 5 and 6 show block diagrams of devices that support change of TAC for wireless networks in accordance with aspects of the present disclosure.

FIG. 5 shows a block diagram 500 of a device 505 that supports change of TAC for wireless networks in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to change of TAC for wireless networks, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may communicate with a first cell of an NTN, determine that the first cell serves a first earth-fixed tracking area and a second earth-fixed tracking area, and monitor the paging resources associated with the first earth-fixed tracking area based on de determining that the first cell serves the first earth-fixed tracking area and the second earth-fixed tracking area. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
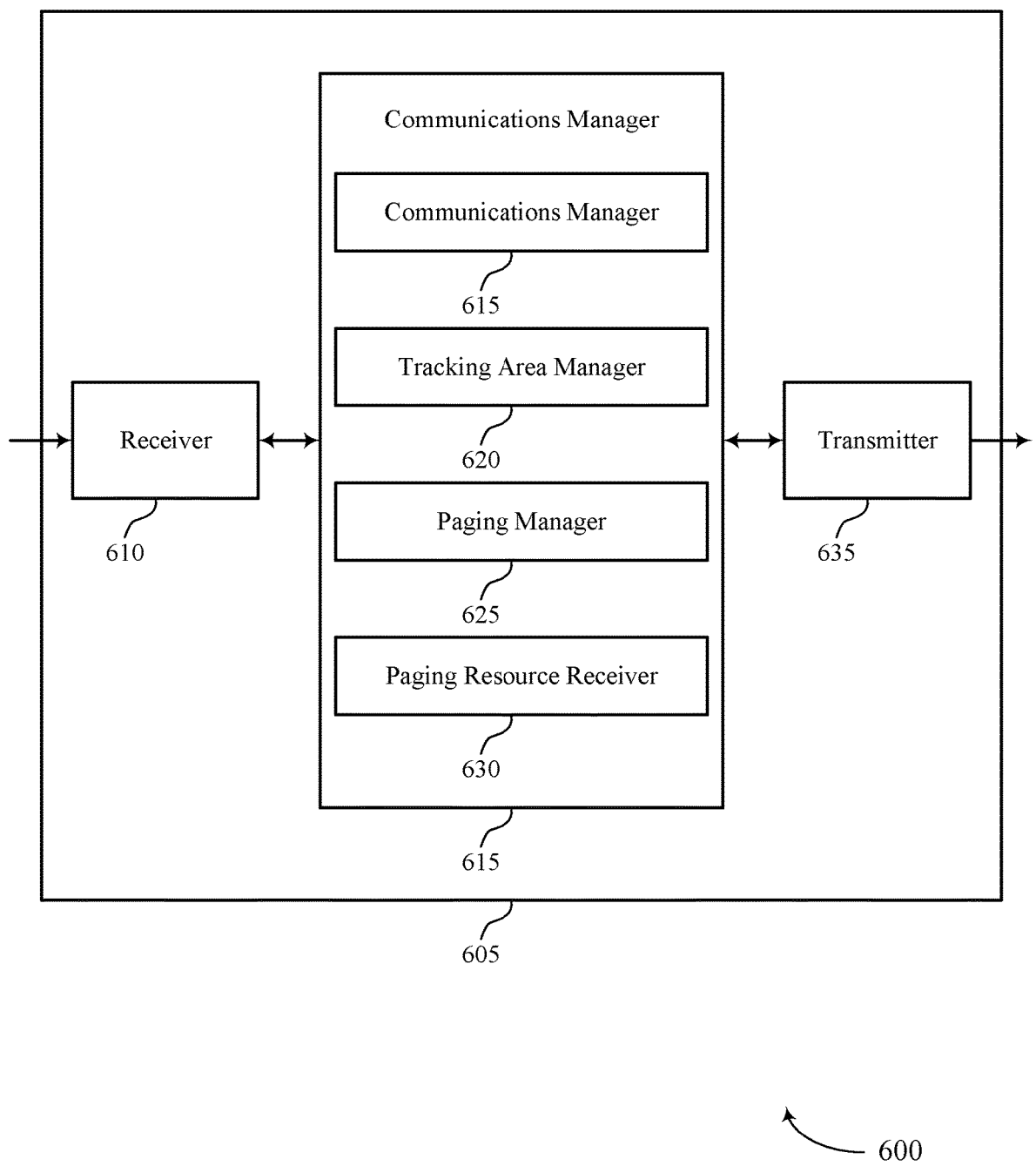

FIG. 6 shows a block diagram 600 of a device 605 that supports change of TAC for wireless networks in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to change of TAC for NTNs, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a communications manager 615, a tracking area manager 620, a paging manager 625, and a paging resource receiver 630. The communications manager 615 may be an example of aspects of the communications manager 810 described herein.

The communications manager 615 may communicate with a first cell of an NTN. The tracking area manager 620 may determine that the first cell serves a first earth-fixed tracking area and a second earth-fixed tracking area. The paging resource receiver 630 may monitor the paging resources associated with the first earth-fixed tracking area based on determining that the first cell serves the first earth-fixed tracking area and the second earth-fixed tracking area.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
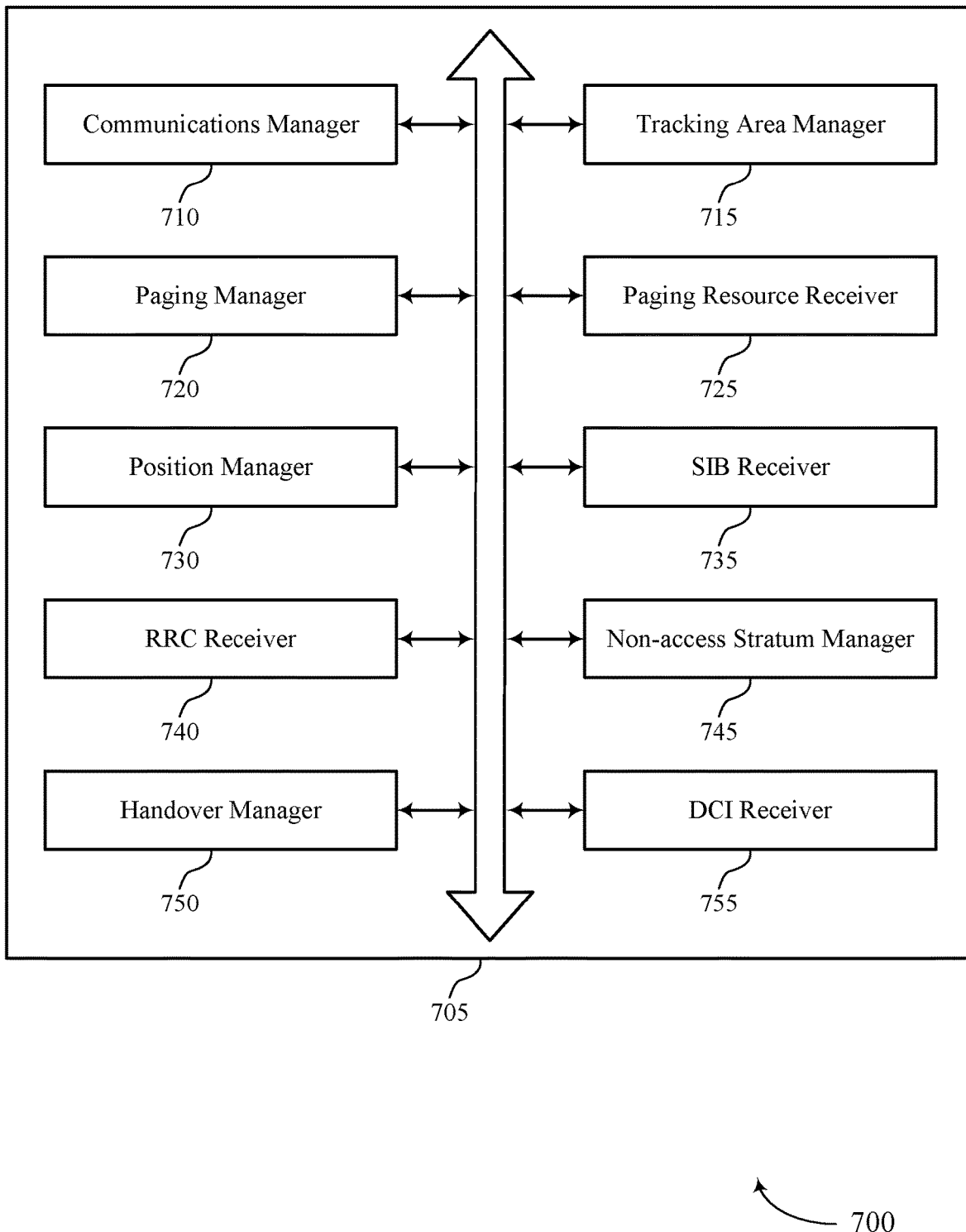
FIG. 7 shows a block diagram of a communications manager that supports change of TAC for wireless networks in accordance with aspects of the present disclosure.

FIG. 7 shows a block diagram 700 of a communications manager 705 that supports change of TAC for wireless networks in accordance with aspects of the present disclosure. The communications manager 705 may be an example of aspects of a communications manager 515, a communications manager 615, or a communications manager 810 described herein. The communications manager 705 may include a communications manager 710, a tracking area manager 715, a paging manager 720, a paging resource receiver 725, a position manager 730, a SIB receiver 735, an RRC receiver 740, a non-access stratum manager 745, a handover manager 750, and a DCI receiver 755. Each of these modules may communicate, directly or indirectly, with one another (e.g., via one or more buses).

The communications manager 710 may communicate with a first cell of an NTN. The tracking area manager 715 may determine that the first cell serves a first earth-fixed tracking area and a second earth-fixed tracking area. In some examples, the communications manager 710 may determine that the UE was associated with the first earth-fixed tracking area prior to the first cell serving the first earth-fixed tracking area and the second earth-fixed tracking area, where determining to monitor the paging resources associated with the first earth-fixed tracking area is based on determining that the UE was associated with the first earth-fixed tracking area. In some examples, the communications manager 710 may communicate with a second cell of the NTN prior to communicating with the first cell of the NTN.

In some examples, the tracking area manager 715 may identify a validity time associated with the temporary tracking area indicator based on receiving the system information broadcast message. In some examples, the tracking area manager 715 may remove the temporary tracking area indicator from a tracking area indicator list of the UE upon expiration of the validity time associated with the temporary tracking area indicator. In some examples, the tracking area manager 715 may store the tracking area indicator and the temporary tracking area indicator in the tracking area indicator list of the UE based on receiving the system information broadcast message, where removing the temporary tracking area indicator from the tracking area indicator list is based on storing the tracking area indicator and the temporary tracking area indicator in the tracking area indicator list.

In some examples, the tracking area manager 715 may determine that a tracking area indicator included in a control message is associated with the first earth-fixed tracking area and a temporary tracking area indicator included in the control message is associated with the second earth-fixed tracking area of the NTN. In some examples, the tracking area manager 715 may determine that a tracking area indicator included in a control message is associated with the second earth-fixed tracking area of the NTN and a temporary tracking area indicator included in the control message is associated with the first earth-fixed tracking area.

The paging manager 720 may determine to monitor paging resources associated with the first earth-fixed tracking area based on determining that the first cell serves the first earth-fixed tracking area and the second earth-fixed tracking area. In some examples, the paging manager 720 may determine a paging message for the first earth-fixed tracking area based on whether the first earth-fixed tracking area is indicated in the tracking area indicator or the temporary tracking area indicator of the system information broadcast message, where monitoring the paging resources of the first earth-fixed tracking area is based on determining the paging message.

The paging resource receiver 725 may monitor the paging resources associated with the first earth-fixed tracking area based on determining to monitor the paging resources associated with the first earth-fixed tracking area. In some examples, the paging resource receiver 725 may monitor a paging message associated with the first earth-fixed tracking area using a first P-RNTI that is different than a second P-RNTI associated with the second earth-fixed tracking area. In some examples, the paging resource receiver 725 may monitor a paging message associated with the first earth-fixed tracking area using the P-RNTI associated with the first earth-fixed tracking area.

The position manager 730 may determine a earth-fixed location of the UE. In some examples, the position manager 730 may determine that the UE is positioned within the first earth-fixed tracking area based on determining the earth-fixed location of the UE, where determining to monitor the paging resources associated with the first earth-fixed tracking area is based on determining that the UE is positioned within the first earth-fixed tracking area.

The SIB receiver 735 may receive a system information broadcast message associated with the first cell that includes a tracking area indicator for the first earth-fixed tracking area and a temporary tracking area indicator for the second earth-fixed tracking area, where determining that the first cell serves the first earth-fixed tracking area and the second earth-fixed tracking area is based on receiving the system information broadcast message. In some examples, the SIB receiver 735 may receive a system information broadcast message associated with the first cell that indicates a P-RNTI associated with the first earth-fixed tracking area and a temporary P-RNTI associated with the second earth-fixed tracking area.

The RRC receiver 740 may receive a radio resource control message indicating that the UE is to monitor the paging resources associated with the first earth-fixed tracking area before determining that the first cell serves the first earth-fixed tracking area and the second earth-fixed tracking area, where determining to monitor the paging resources associated with the first earth-fixed tracking area is based on receiving the radio resource control message.

The non-access stratum manager 745 may report the first earth-fixed tracking area and the second earth-fixed tracking area to a non-access stratum of the UE, where determining that the first cell serves the first earth-fixed tracking area and the second earth-fixed tracking area is based on receiving a system information broadcast message including a first tracking area indicator associated with the first earth-fixed tracking area and a second tracking area indicator associated with the second earth-fixed tracking area. In some examples, the non-access stratum manager 745 may determine whether to perform a registration update based on the first tracking area indicator and the second tracking area indicator.

The handover manager 750 may perform a handover procedure to establish a communication link with the first cell, where communicating with the first cell is based on performing the handover procedure.

The DCI receiver 755 may receive a DCI that includes an indication of whether a paging message is associated with the first earth-fixed tracking area or is associated with the second earth-fixed tracking area, where monitoring the paging resources associated with the first earth-fixed tracking area is based on receiving the DCI that includes the indication. In some examples, the DCI receiver 755 may receive a DCI that includes an indication that a first paging message is associated with the first earth-fixed tracking area and a second paging message is associated with the second earth-fixed tracking area. In some cases, the DCI includes a first value of the indication for the paging message being associated with the first earth-fixed tracking area or a second value of the indication for the paging message being associated with the second earth-fixed tracking area. In some examples, the DCI receiver 755 may receive a DCI that includes a first value of the indication for the paging message being associated with the first earth-fixed tracking area 305-*a*, a second value of the indication for the paging message being associated with the second earth-fixed tracking area 305-*b*, or a third value of the indication for the paging message being associated with the first second earth-fixed tracking area 305-*a* and the second earth-fixed tracking area 305-*a*.

Figure 8:
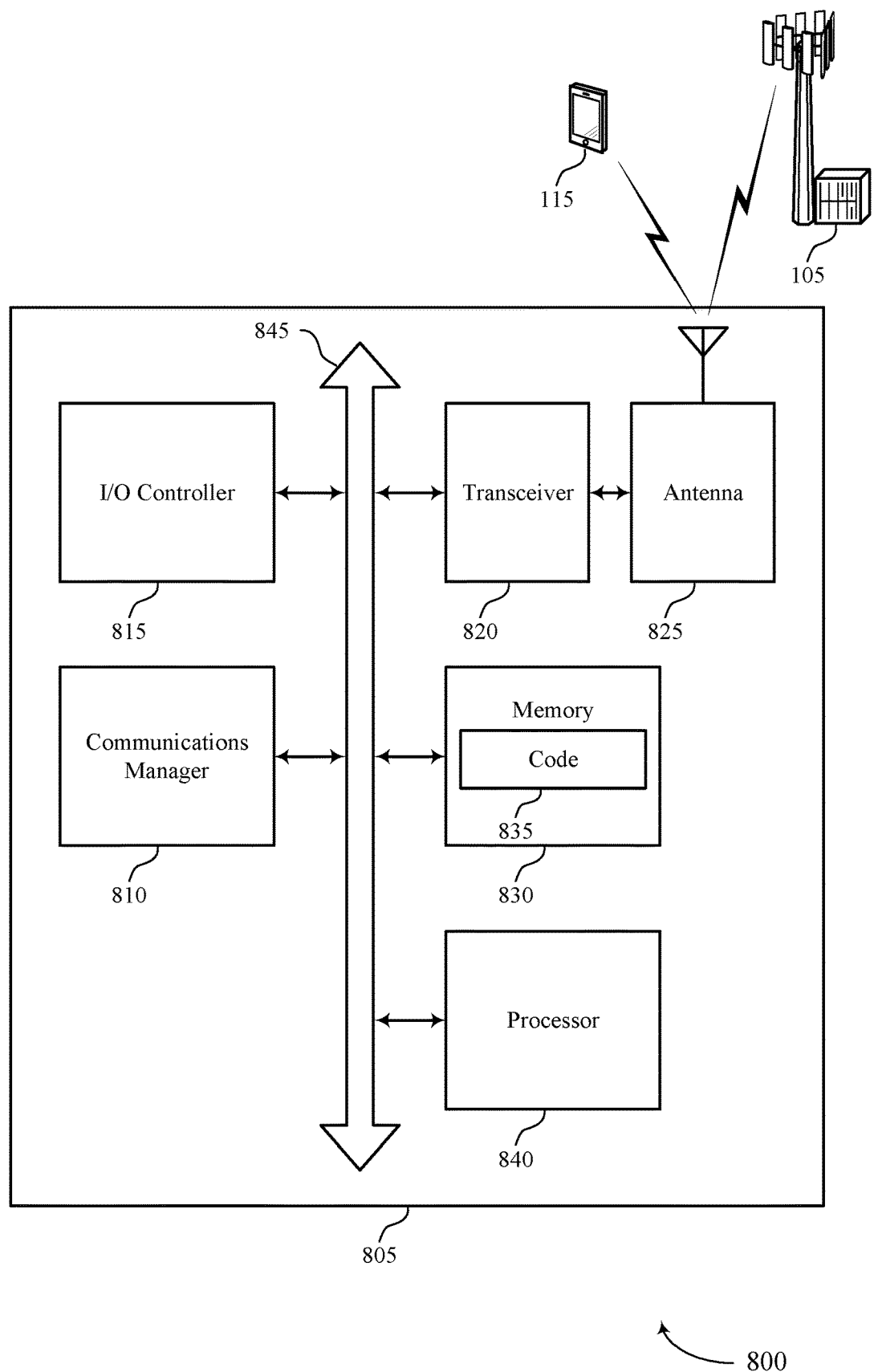
FIG. 8 shows a diagram of a system including a device that supports change of TAC for wireless networks in accordance with aspects of the present disclosure.

FIG. 8 shows a diagram of a system 800 including a device 805 that supports change of TAC for wireless networks in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may communicate with a first cell of an NTN, determine that the first cell serves a first earth-fixed tracking area and a second earth-fixed tracking area, determine to monitor paging resources associated with the first earth-fixed tracking area based on determining that the first cell serves the first earth-fixed tracking area and the second earth-fixed tracking area, and monitor the paging resources associated with the first earth-fixed tracking area based on determining to monitor the paging resources associated with the first earth-fixed tracking area.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting change of TAC for NTNs).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
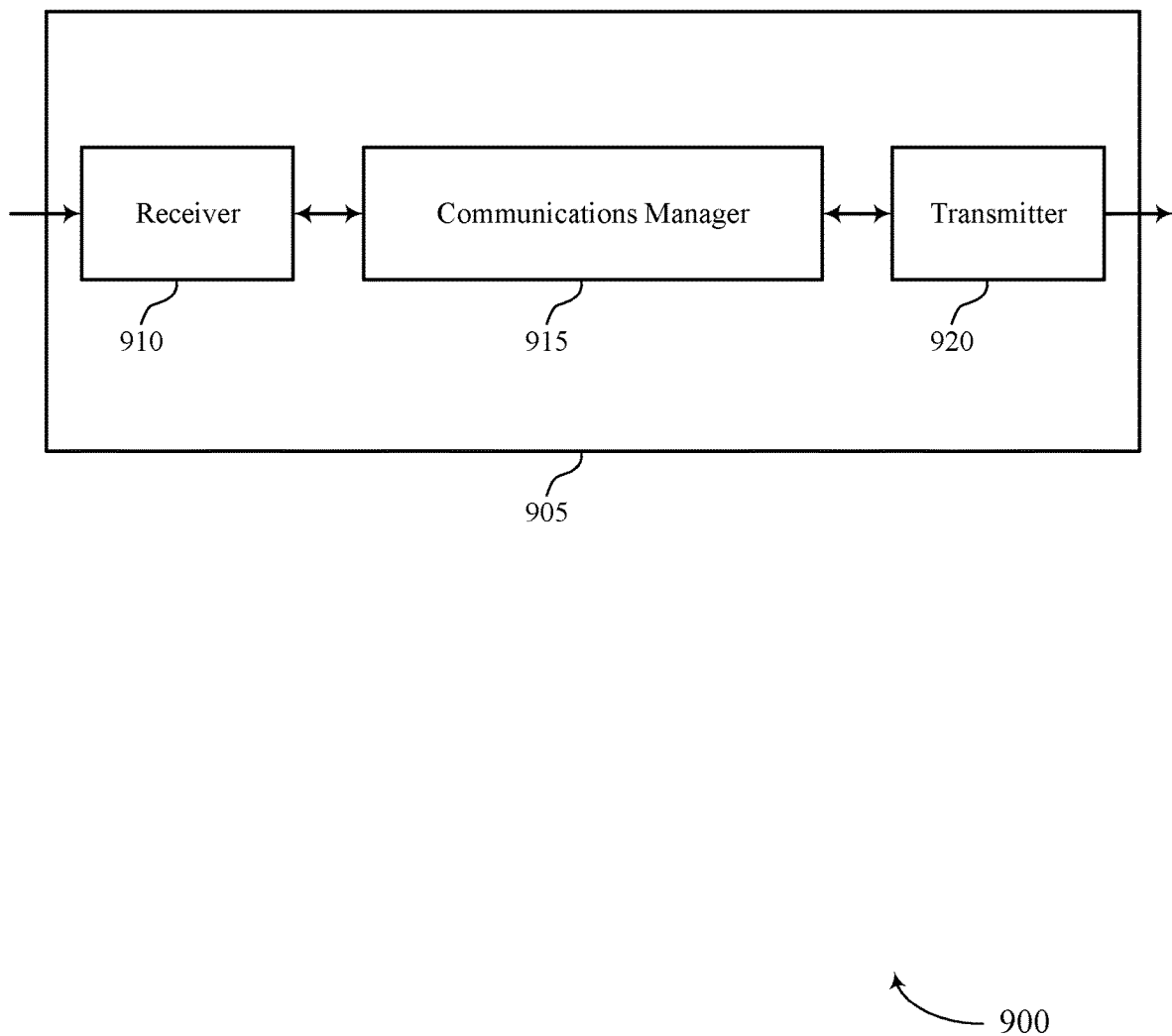
FIGS. 9 and 10 show block diagrams of devices that support change of TAC for wireless networks in accordance with aspects of the present disclosure.

FIG. 9 shows a block diagram 900 of a device 905 that supports change of TAC for wireless networks in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to change of TAC for NTNs, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may communicate with a UE via a first cell of an NTN, determine that the first cell serves a first earth-fixed tracking area and a second earth-fixed tracking area, and transmit one or more first paging messages associated with the first earth-fixed tracking area and one or more second paging messages associated with the second earth-fixed tracking area based on determining that the first cell serves the first earth-fixed tracking area and the second earth-fixed tracking area. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
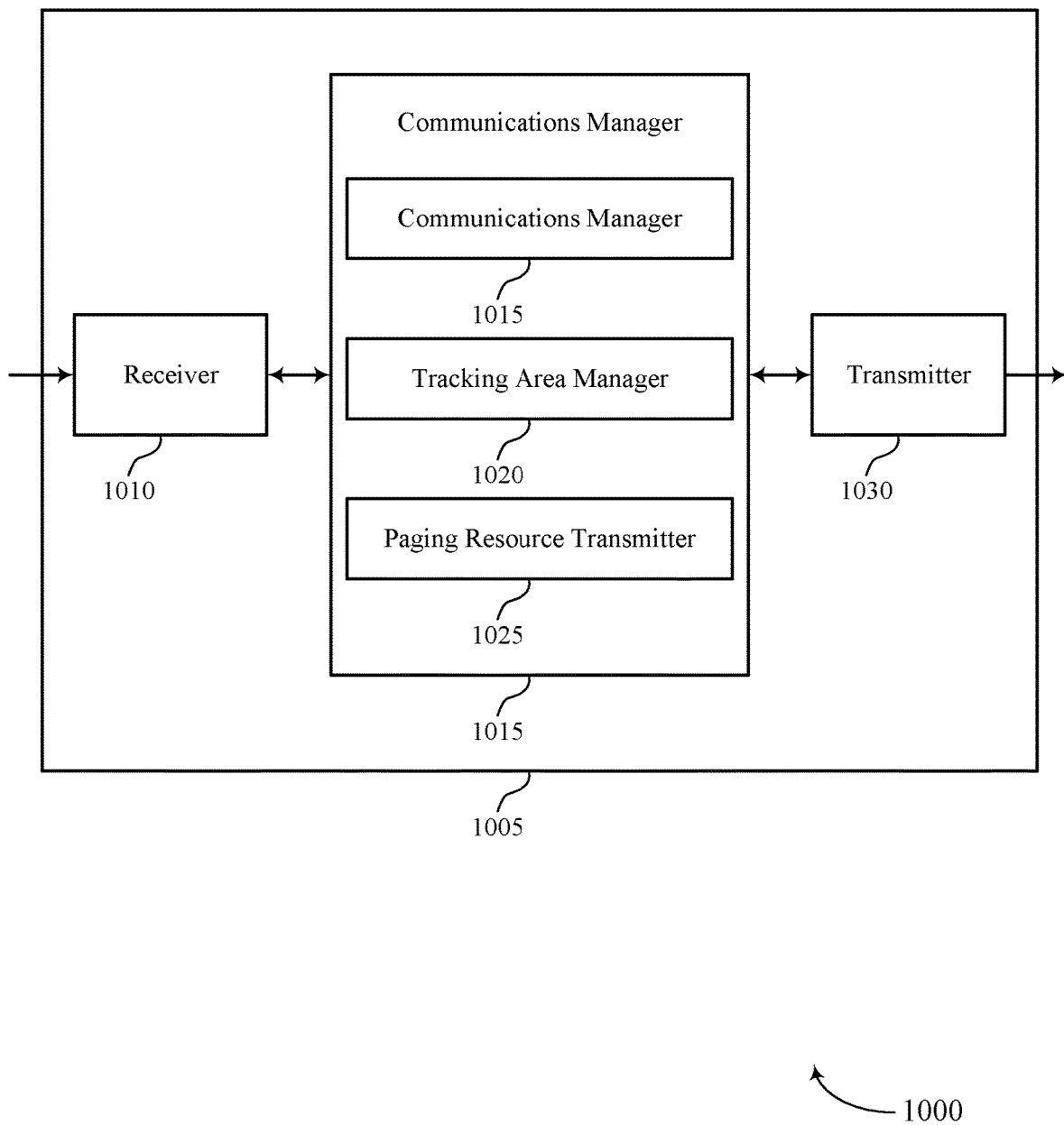

FIG. 10 shows a block diagram 1000 of a device 1005 that supports change of TAC for wireless networks in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to change of TAC for NTNs, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a communications manager 1015, a tracking area manager 1020, and a paging resource transmitter 1025. The communications manager 1015 may be an example of aspects of the communications manager 1210 described herein.

The communications manager 1015 may communicate with a UE via a first cell of an NTN.

The tracking area manager 1020 may determine that the first cell serves a first earth-fixed tracking area and a second earth-fixed tracking area.

The paging resource transmitter 1025 may transmit one or more first paging messages associated with the first earth-fixed tracking area and one or more second paging messages associated with the second earth-fixed tracking area based on determining that the first cell serves the first earth-fixed tracking area and the second earth-fixed tracking area.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
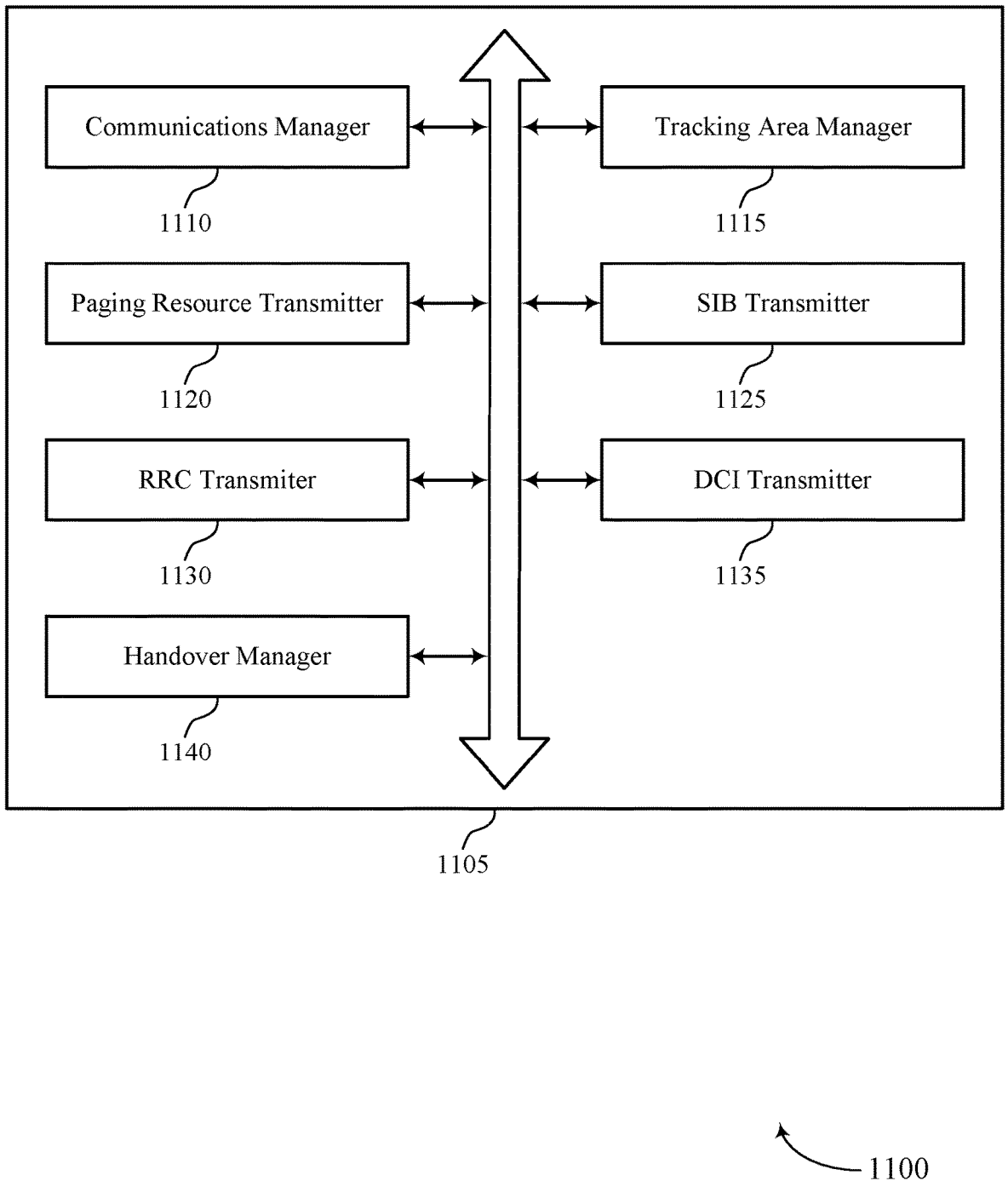
FIG. 11 shows a block diagram of a communications manager that supports change of TAC for wireless networks in accordance with aspects of the present disclosure.

FIG. 11 shows a block diagram 1100 of a communications manager 1105 that supports change of TAC for wireless networks in accordance with aspects of the present disclosure. The communications manager 1105 may be an example of aspects of a communications manager 915, a communications manager 1015, or a communications manager 1210 described herein. The communications manager 1105 may include a communications manager 1110, a tracking area manager 1115, a paging resource transmitter 1120, a SIB transmitter 1125, an RRC transmitter 1130, a DCI transmitter 1135, and a handover manager 1140. Each of these modules may communicate, directly or indirectly, with one another (e.g., via one or more buses).

The communications manager 1110 may communicate with a UE via a first cell of an NTN.

In some examples, the communications manager 1110 may transmit a control message including a tracking area indicator associated with the first earth-fixed tracking area and a temporary tracking area indicator associated with the second earth-fixed tracking area.

In some examples, the communications manager 1110 may transmit a control message including a tracking area indicator associated with the second earth-fixed tracking area and a temporary tracking area indicator associated with the first earth-fixed tracking area.

In some examples, the communications manager 1110 may communicate with the UE via a second cell of the NTN prior to communicating with the UE via the first cell of the NTN.

The tracking area manager 1115 may determine that the first cell serves a first earth-fixed tracking area and a second earth-fixed tracking area.

In some examples, the tracking area manager 1115 may transmit a validity time associated with the temporary tracking area indicator to the UE, where transmitting the validity time associated with the temporary tracking area indicator is based on transmitting the system information broadcast message.

The paging resource transmitter 1120 may transmit one or more first paging messages associated with the first earth-fixed tracking area and one or more second paging messages associated with the second earth-fixed tracking area based on determining that the first cell serves the first earth-fixed tracking area and the second earth-fixed tracking area.

In some examples, the paging resource transmitter 1120 may transmit a paging message during a paging occasion that is associated with the first earth-fixed tracking area using a first P-RNTI that is different than a second P-RNTI associated with the second earth-fixed tracking area.

The SIB transmitter 1125 may transmit a system information broadcast message associated with the first cell that includes a tracking area indicator for the first earth-fixed tracking area and a temporary tracking area indicator for the second earth-fixed tracking area, where transmitting the system information broadcast message including the tracking area indicator for the first earth-fixed tracking area and the temporary tracking area indicator for the second earth-fixed tracking area is based on determining the first cell serves the first earth-fixed tracking area and the second earth-fixed tracking area.

In some examples, the SIB transmitter 1125 may transmit a second system information broadcast message associated with the first cell after expiration of the validity time associated with the temporary tracking area indicator, the second system information broadcast message including the tracking area indicator for the first earth-fixed tracking area. In some examples, the SIB transmitter 1125 may transmit a system information broadcast message associated with the first cell that indicates a P-RNTI associated with the first earth-fixed tracking area and a temporary P-RNTI associated with the second earth-fixed tracking area.

The RRC transmitter 1130 may transmit a radio resource control message indicating that the UE is to monitor paging resources associated with the first earth-fixed tracking area before determining that the first cell serves the first earth-fixed tracking area and the second earth-fixed tracking area.

The DCI transmitter 1135 may transmit a DCI that includes an indication of whether a paging message is associated with the first earth-fixed tracking area or is associated with the second earth-fixed tracking area. In some examples, the DCI transmitter 1135 may transmit a DCI that includes an indication that a first paging message is associated with the first earth-fixed tracking area and a second paging message is associated with the second earth-fixed tracking area. In some cases, the DCI includes a first value of the indication for the paging message being associated with the first earth-fixed tracking area or a second value of the indication for the paging message being associated with the second earth-fixed tracking area.

The handover manager 1140 may perform a handover procedure to establish a communication link with the UE via the first cell, where communicating with the UE via the first cell is based on performing the handover procedure.

Figure 12:
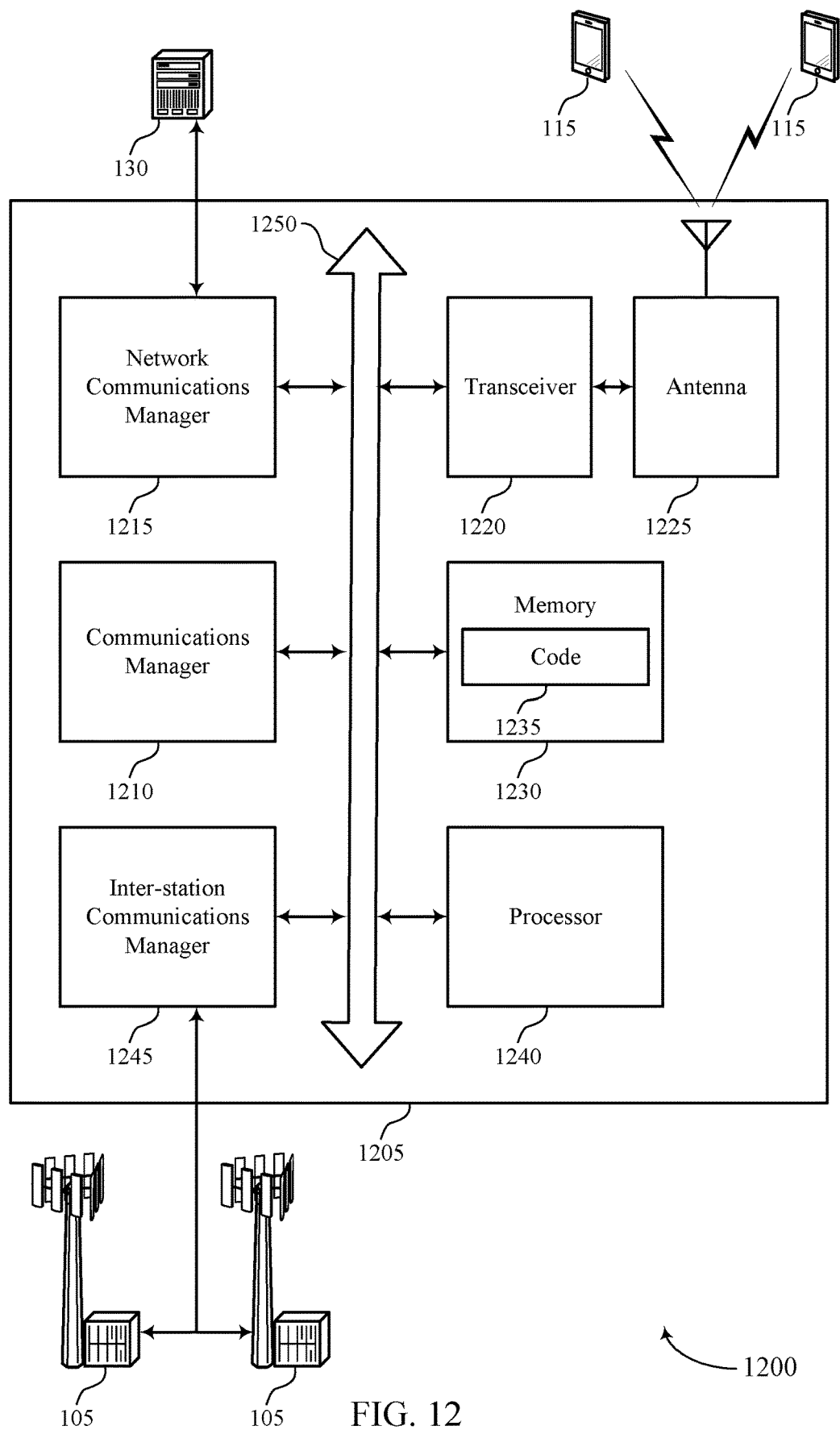
FIG. 12 shows a diagram of a system including a device that supports change of TAC for wireless networks in accordance with aspects of the present disclosure.

FIG. 12 shows a diagram of a system 1200 including a device 1205 that supports change of TAC for wireless networks in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may communicate with a UE via a first cell of an NTN, determine that the first cell serves a first earth-fixed tracking area and a second earth-fixed tracking area, and transmit one or more first paging messages associated with the first earth-fixed tracking area and one or more second paging messages associated with the second earth-fixed tracking area based on determining that the first cell serves the first earth-fixed tracking area and the second earth-fixed tracking area.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting change of TAC for NTNs).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
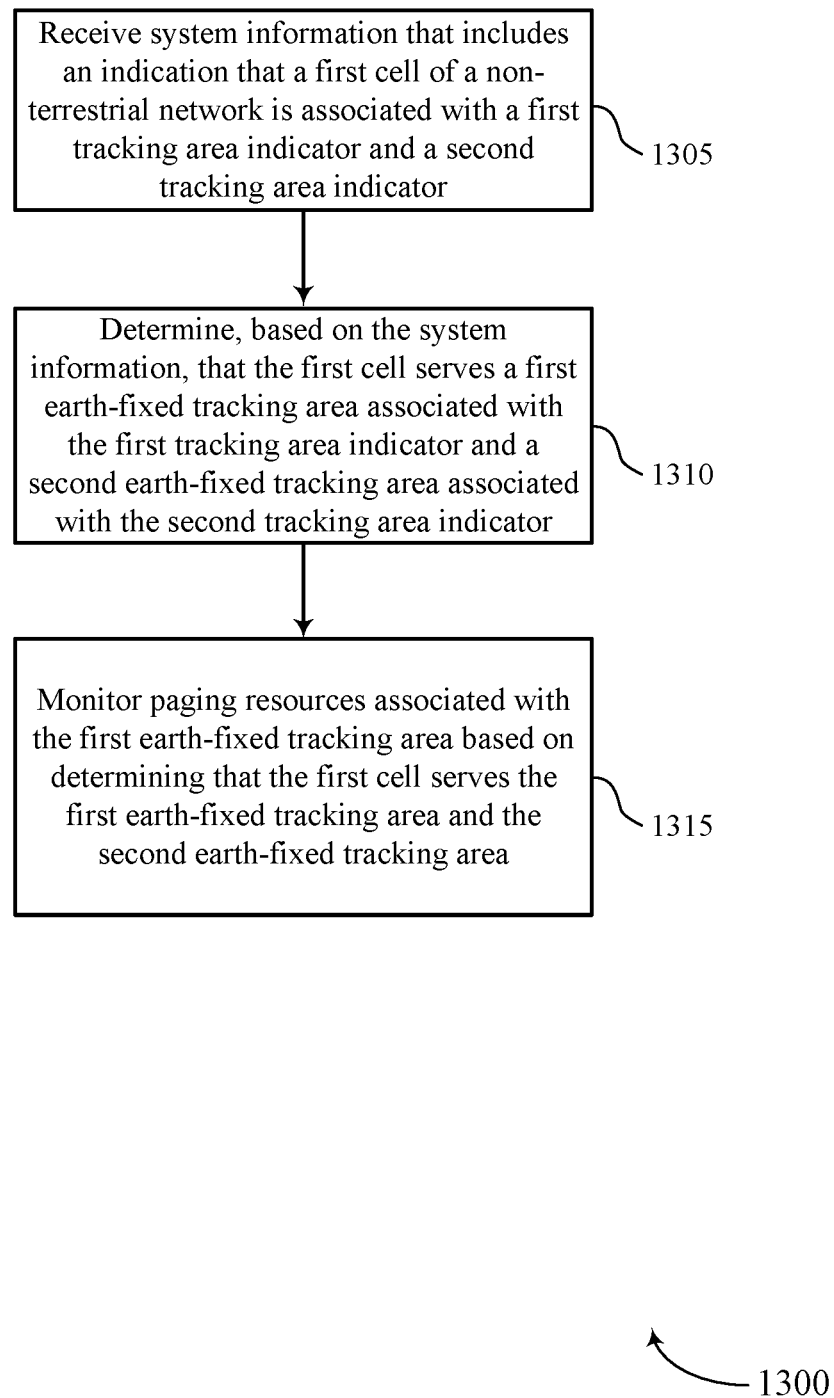
FIGS. 13 through 20 show flowcharts illustrating methods that support change of TAC for wireless networks in accordance with aspects of the present disclosure.

FIG. 13 shows a flowchart illustrating a method 1300 that supports change of TAC for wireless networks in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive system information that includes an indication that a first cell of an NTN is associated with a first tracking area indicator and a second tracking area indicator. The operations of 1305 may be performed according to the methods described herein. In some examples, aspects of the operations of 1305 may be performed by a communications manager as described with reference to FIGS. 5 through 8.

At 1310, the UE may determine, based on the system information, that the first cell serves a first earth-fixed tracking area associated with the first tracking area indicator and a second earth-fixed tracking area associated with the second tracking area indicator. The operations of 1310 may be performed according to the methods described herein. In some examples, aspects of the operations of 1310 may be performed by a tracking area manager as described with reference to FIGS. 5 through 8.

At 1315, the UE may monitor paging resources associated with the first earth-fixed tracking area based on determining that the first cell serves the first earth-fixed tracking area and the second earth-fixed tracking area. The operations of 1315 may be performed according to the methods described herein. In some examples, aspects of the operations of 1315 may be performed by a paging resource manager as described with reference to FIGS. 5 through 8.

Figure 14:
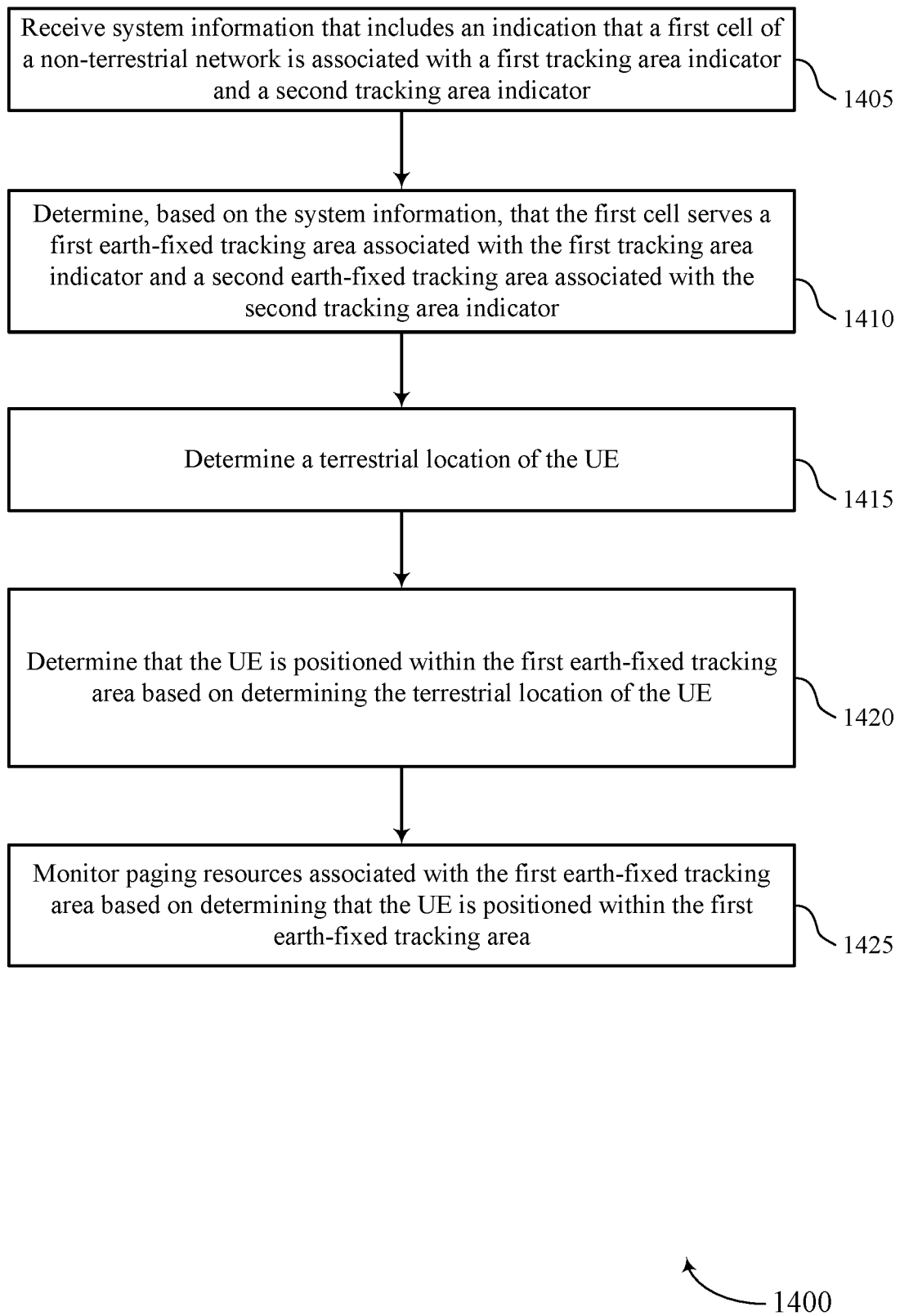

FIG. 14 shows a flowchart illustrating a method 1400 that supports change of TAC for wireless networks in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive system information that includes an indication that a first cell of an NTN is associated with a first tracking area indicator and a second tracking area indicator. The operations of 1405 may be performed according to the methods described herein. In some examples, aspects of the operations of 1405 may be performed by a communications manager as described with reference to FIGS. 5 through 8.

At 1410, the UE may determine, based on the system information, that the first cell serves a first earth-fixed tracking area associated with the first tracking area indicator and a second earth-fixed tracking area associated with the second tracking area indicator. The operations of 1410 may be performed according to the methods described herein. In some examples, aspects of the operations of 1410 may be performed by a tracking area manager as described with reference to FIGS. 5 through 8.

At 1415, the UE may determine a earth-fixed location of the UE. The operations of 1415 may be performed according to the methods described herein. In some examples, aspects of the operations of 1415 may be performed by a position manager as described with reference to FIGS. 5 through 8.

At 1420, the UE may determine that the UE is positioned within the first earth-fixed tracking area based on determining the earth-fixed location of the UE. The operations of 1420 may be performed according to the methods described herein. In some examples, aspects of the operations of 1420 may be performed by a position manager as described with reference to FIGS. 5 through 8.

At 1425, the UE may monitor paging resources associated with the first earth-fixed tracking area based on determining that the UE is positioned within the first earth-fixed tracking area. The operations of 1425 may be performed according to the methods described herein. In some examples, aspects of the operations of 1430 may be performed by a paging resource receiver as described with reference to FIGS. 5 through 8.

Figure 15:
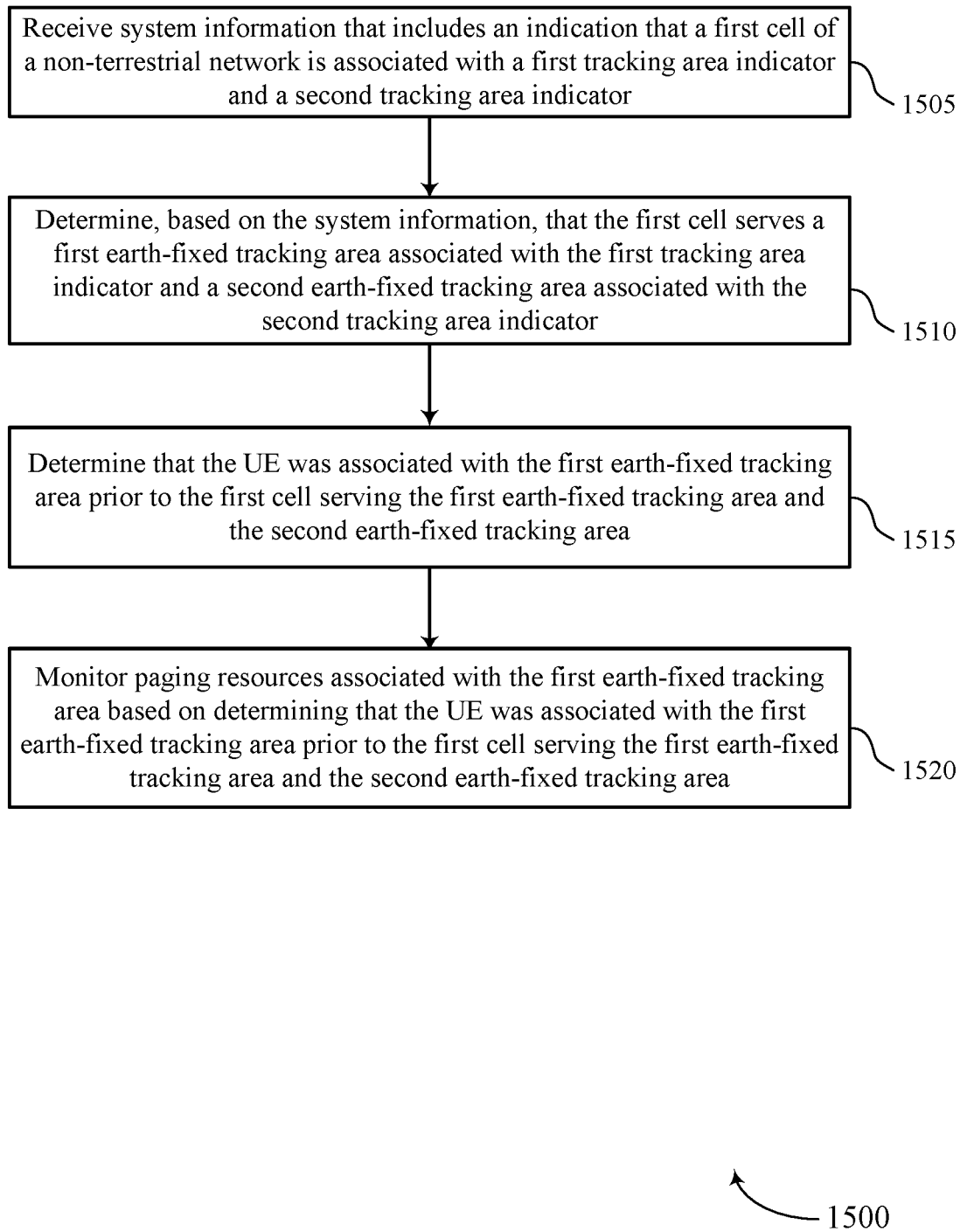

FIG. 15 shows a flowchart illustrating a method 1500 that supports change of TAC for wireless networks in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive system information that includes an indication that a first cell of an NTN is associated with a first tracking area indicator and a second tracking area indicator. The operations of 1505 may be performed according to the methods described herein. In some examples, aspects of the operations of 1505 may be performed by a communications manager as described with reference to FIGS. 5 through 8.

At 1510, the UE may determine, based on the system information, that the first cell serves a first earth-fixed tracking area associated with the first tracking area indicator and a second earth-fixed tracking area associated with the second tracking area indicator. The operations of 1510 may be performed according to the methods described herein. In some examples, aspects of the operations of 1510 may be performed by a tracking area manager as described with reference to FIGS. 5 through 8.

At 1515, the UE may determine that the UE was associated with the first earth-fixed tracking area prior to the first cell serving the first earth-fixed tracking area and the second earth-fixed tracking area, where determining to monitor the paging resources associated with the first earth-fixed tracking area is based on determining that the UE was associated with the first earth-fixed tracking area. The operations of 1515 may be performed according to the methods described herein. In some examples, aspects of the operations of 1515 may be performed by a communications manager as described with reference to FIGS. 5 through 8.

At 1520, the UE may monitor paging resources associated with the first earth-fixed tracking area based on determining that the UE was associated with the first earth-fixed tracking area prior to the first cell serving the first earth-fixed tracking area and the second earth-fixed tracking area The operations of 1525 may be performed according to the methods described herein. In some examples, aspects of the operations of 1525 may be performed by a paging resource receiver as described with reference to FIGS. 5 through 8.

Figure 16:
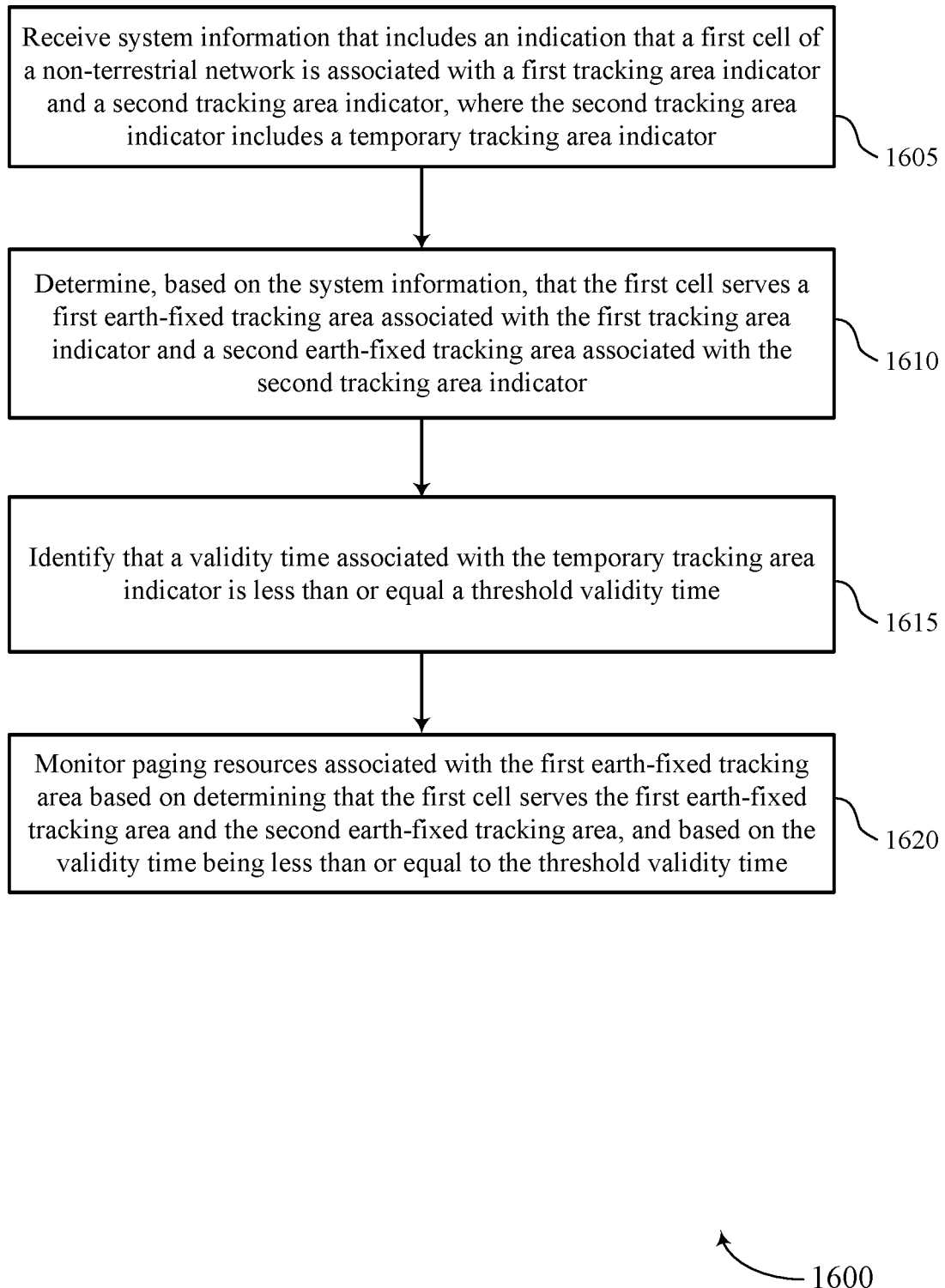

FIG. 16 shows a flowchart illustrating a method 1600 that supports change of TAC for wireless networks in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive system information that includes an indication that a first cell of an NTN is associated with a first tracking area indicator and a second tracking area indicator, where the second tracking area indicator includes a temporary tracking area indicator. The operations of 1605 may be performed according to the methods described herein. In some examples, aspects of the operations of 1605 may be performed by a communications manager as described with reference to FIGS. 5 through 8.

At 1610, the UE may determine, based on the system information, that the first cell serves a first earth-fixed tracking area associated with the first tracking area indicator and a second earth-fixed tracking area associated with the second tracking area indicator. The operations of 1610 may be performed according to the methods described herein. In some examples, aspects of the operations of 1610 may be performed by a SIB receiver as described with reference to FIGS. 5 through 8.

At 1615, the UE may identify that a validity time associated with the temporary tracking area indicator is less than or equal a threshold validity time. The operations of 1615 may be performed according to the methods described herein. In some examples, aspects of the operations of 1615 may be performed by a tracking area manager as described with reference to FIGS. 5 through 8.

At 1620, the UE may monitor paging resources associated with the first earth-fixed tracking area based on determining that the first cell serves the first earth-fixed tracking area and the second earth-fixed tracking area, and based on the validity time being less than or equal to the threshold validity time. The operations of 1625 may be performed according to the methods described herein. In some examples, aspects of the operations of 1625 may be performed by a paging resource receiver as described with reference to FIGS. 5 through 8.

Figure 17:
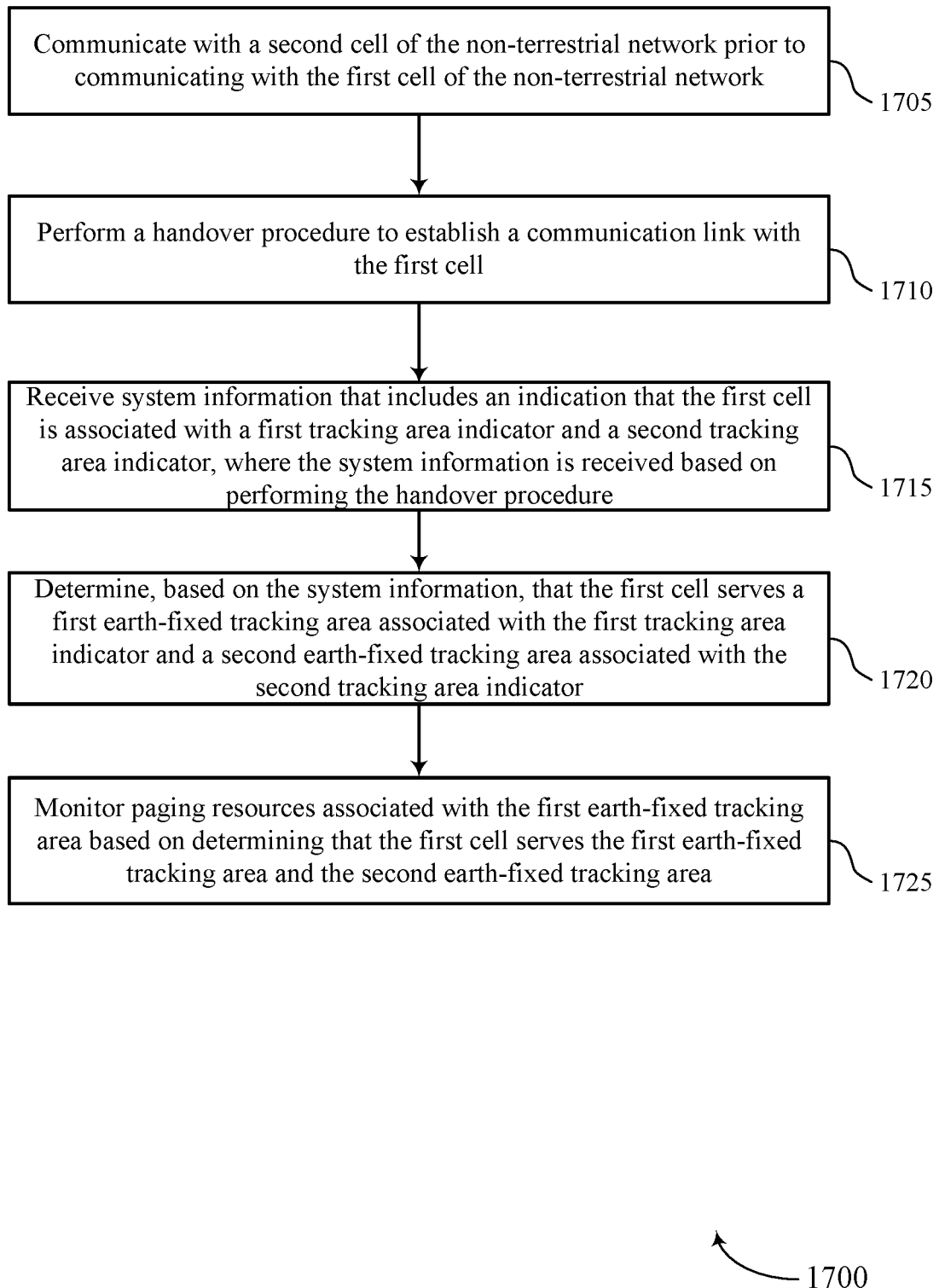

FIG. 17 shows a flowchart illustrating a method 1700 that supports change of TAC for wireless networks in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may communicate with a second cell of the NTN prior to communicating with the first cell of the NTN. The operations of 1705 may be performed according to the methods described herein. In some examples, aspects of the operations of 1705 may be performed by a communications manager as described with reference to FIGS. 5 through 8.

At 1710, the UE may perform a handover procedure to establish a communication link with the first cell. The operations of 1710 may be performed according to the methods described herein. In some examples, aspects of the operations of 1710 may be performed by a handover manager as described with reference to FIGS. 5 through 8.

At 1715, the UE may receive system information that includes an indication that the first cell is associated with a first tracking area indicator and a second tracking area indicator, where receiving the system information is based on performing the handover procedure. The operations of 1715 may be performed according to the methods described herein. In some examples, aspects of the operations of 1715 may be performed by a communications manager as described with reference to FIGS. 5 through 8.

At 1720, the UE may determine, based on the system information, that the first cell serves a first earth-fixed tracking area associated with the first tracking area indicator and a second earth-fixed tracking area associated with the second tracking area indicator. The operations of 1720 may be performed according to the methods described herein. In some examples, aspects of the operations of 1720 may be performed by a tracking area manager as described with reference to FIGS. 5 through 8.

At 1725, the UE may monitor paging resources associated with the first earth-fixed tracking area based on determining that the first cell serves the first earth-fixed tracking area and the second earth-fixed tracking area. The operations of 1730 may be performed according to the methods described herein. In some examples, aspects of the operations of 1730 may be performed by a paging resource receiver as described with reference to FIGS. 5 through 8.

Figure 18:
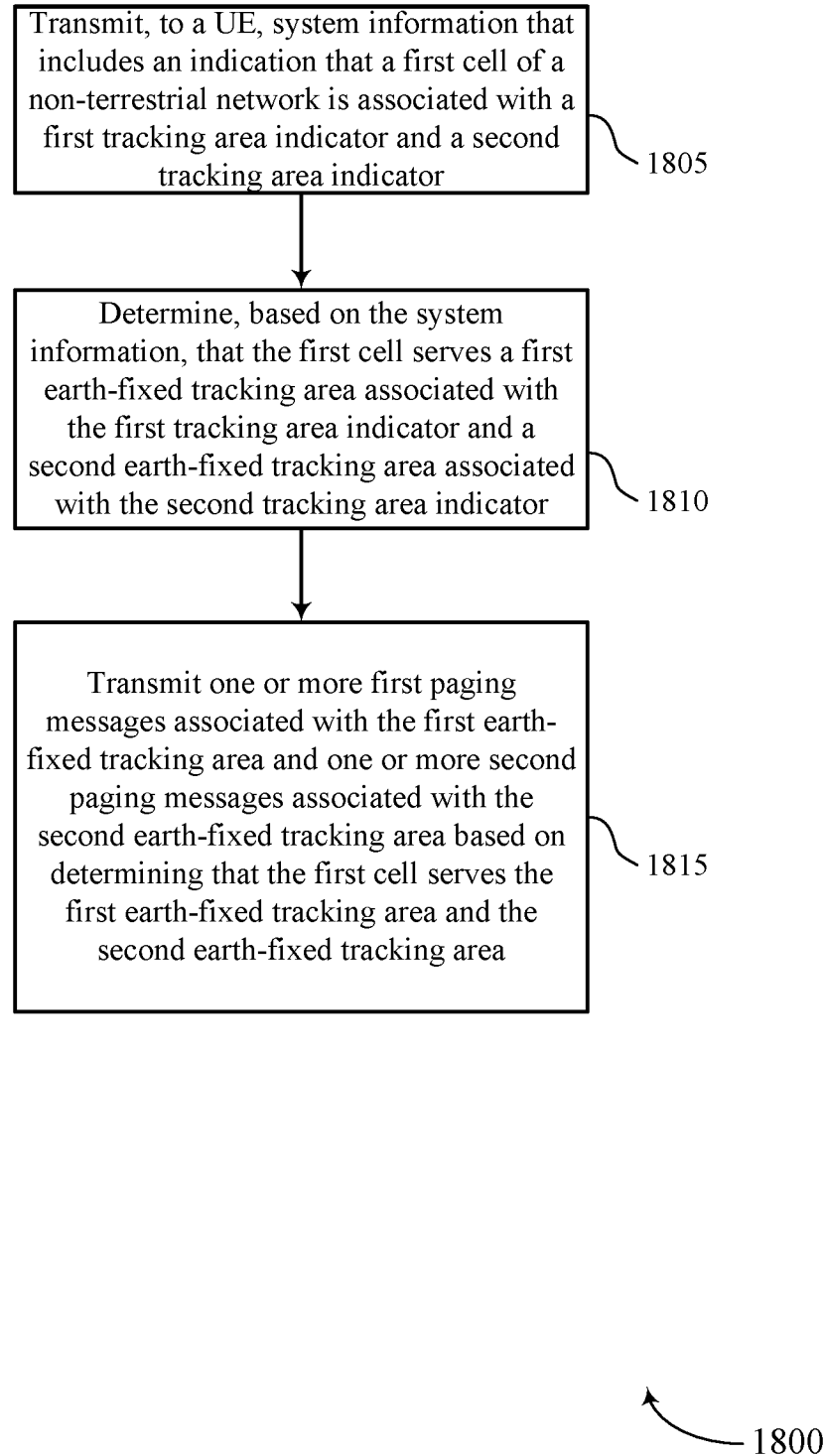

FIG. 18 shows a flowchart illustrating a method 1800 that supports change of TAC for wireless networks in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, system information that includes an indication that a first cell of an NTN is associated with a first tracking area indicator and a second tracking area indicator. The operations of 1805 may be performed according to the methods described herein. In some examples, aspects of the operations of 1805 may be performed by a communications manager as described with reference to FIGS. 9 through 12.

At 1810, the base station may determine, based on the system information, that the first cell serves a first earth-fixed tracking area associated with the first tracking area indicator and a second earth-fixed tracking area associated with the second tracking area indicator. The operations of 1810 may be performed according to the methods described herein. In some examples, aspects of the operations of 1810 may be performed by a tracking area manager as described with reference to FIGS. 9 through 12.

At 1815, the base station may transmit one or more first paging messages associated with the first earth-fixed tracking area and one or more second paging messages associated with the second earth-fixed tracking area based on determining that the first cell serves the first earth-fixed tracking area and the second earth-fixed tracking area. The operations of 1815 may be performed according to the methods described herein. In some examples, aspects of the operations of 1815 may be performed by a paging resource transmitter as described with reference to FIGS. 9 through 12.

Figure 19:
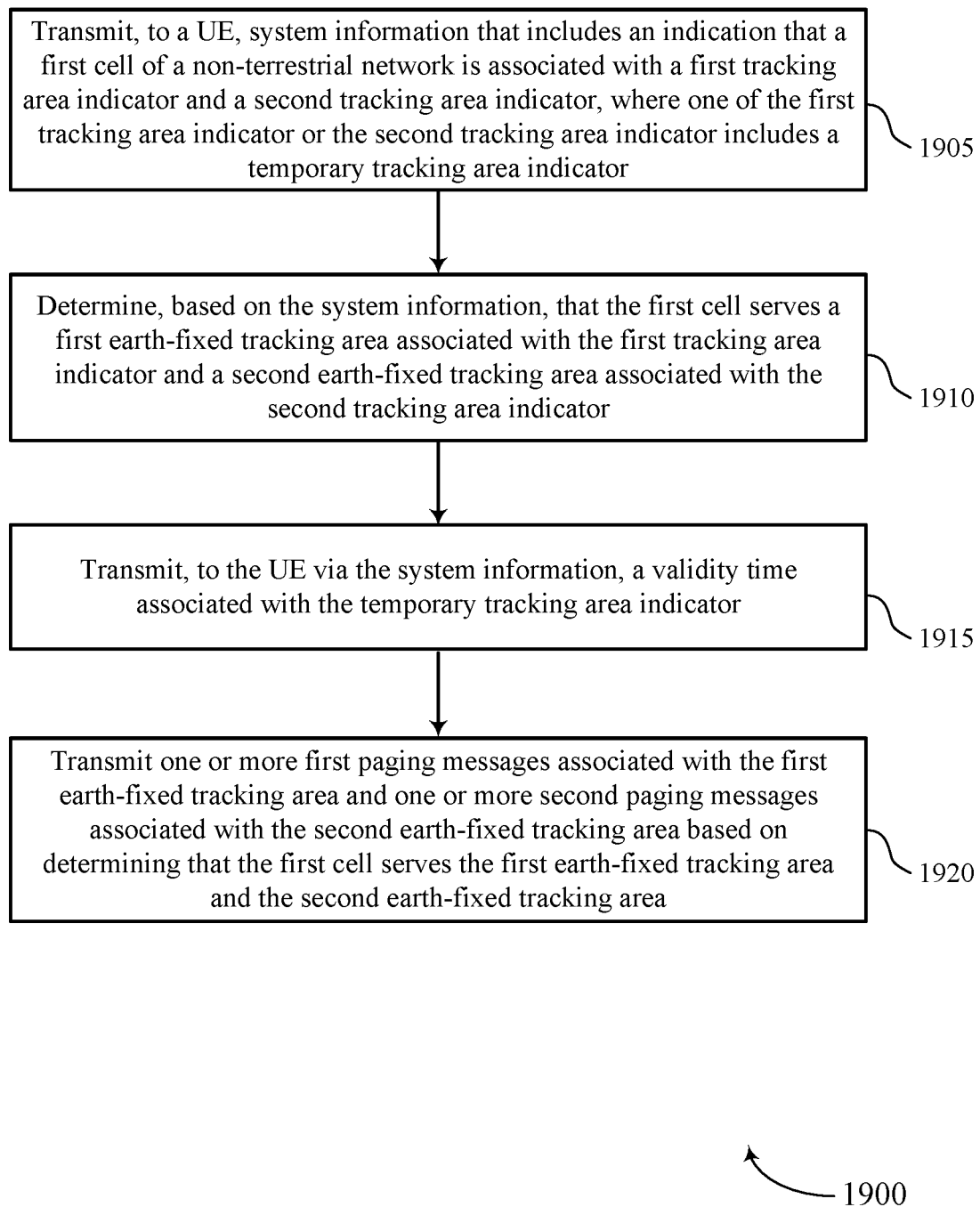

FIG. 19 shows a flowchart illustrating a method 1900 that supports change of TAC for wireless networks in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, system information that includes an indication that a first cell of an NTN is associated with a first tracking area indicator and a second tracking area indicator, where one of the first tracking area indicator or the second tracking area indicator includes a temporary tracking area indicator. The operations of 1905 may be performed according to the methods described herein. In some examples, aspects of the operations of 1905 may be performed by a communications manager as described with reference to FIGS. 9 through 12.

At 1910, the base station may determine, based on the system information, that the first cell serves a first earth-fixed tracking area associated with the first tracking area indicator and a second earth-fixed tracking area associated with the second tracking area indicator. The operations of 1910 may be performed according to the methods described herein. In some examples, aspects of the operations of 1910 may be performed by a tracking area manager as described with reference to FIGS. 9 through 12.

At 1915, the base station may transmit, to the UE via the system information, a validity time associated with the temporary tracking area indicator. The operations of 1915 may be performed according to the methods described herein. In some examples, aspects of the operations of 1915 may be performed by a SIB transmitter as described with reference to FIGS. 9 through 12.

At 1920, the base station may transmit one or more first paging messages associated with the first earth-fixed tracking area and one or more second paging messages associated with the second earth-fixed tracking area based on determining that the first cell serves the first earth-fixed tracking area and the second earth-fixed tracking area. The operations of 1920 may be performed according to the methods described herein. In some examples, aspects of the operations of 1920 may be performed by a paging resource transmitter as described with reference to FIGS. 9 through 12.

Figure 20:
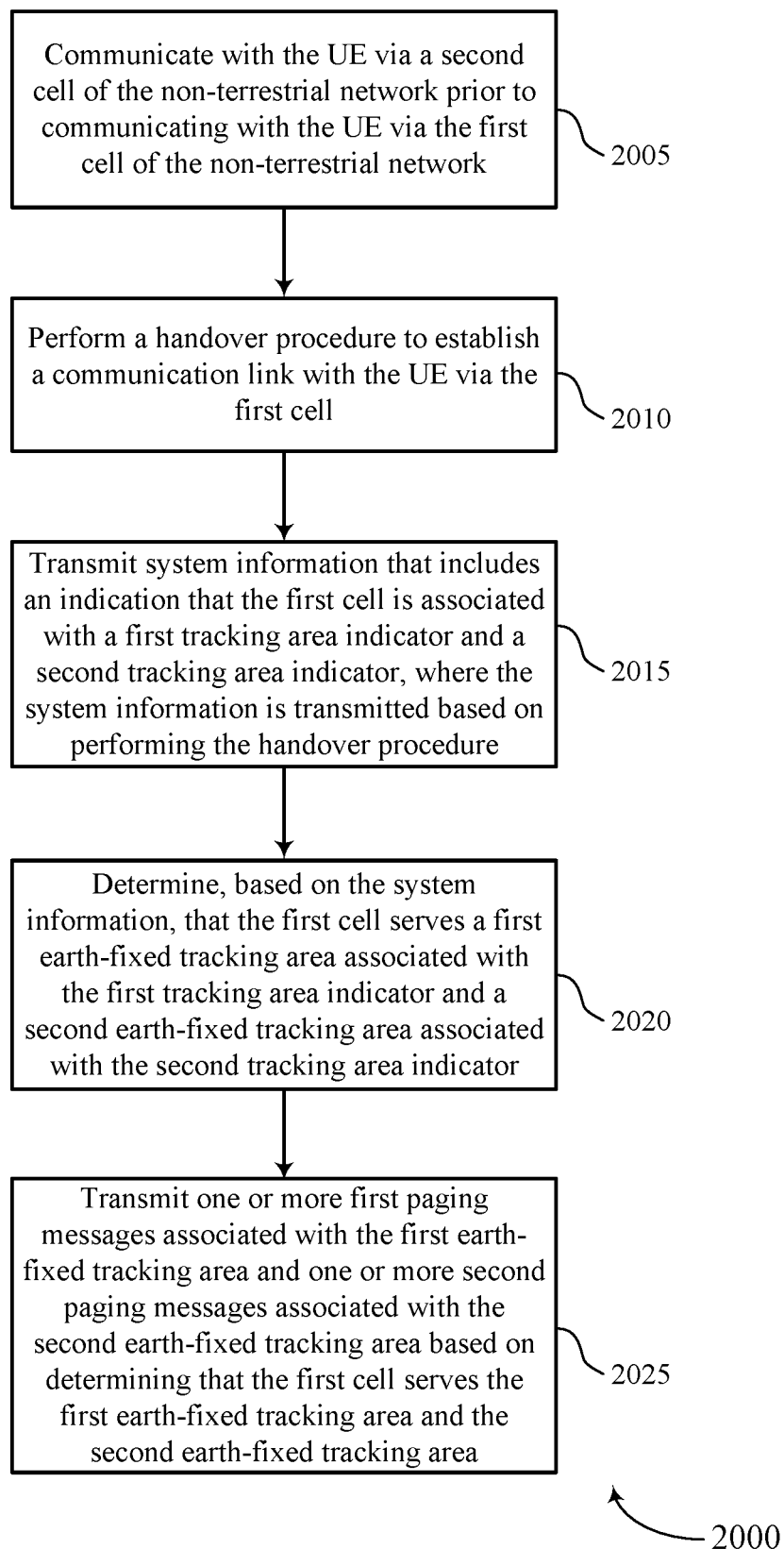

FIG. 20 shows a flowchart illustrating a method 2000 that supports change of TAC for wireless networks in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may communicate with the UE via a second cell of the NTN prior to communicating with the UE via the first cell of the NTN. The operations of 2005 may be performed according to the methods described herein. In some examples, aspects of the operations of 2005 may be performed by a communications manager as described with reference to FIGS. 9 through 12.

At 2010, the base station may perform a handover procedure to establish a communication link with the UE via the first cell. The operations of 2010 may be performed according to the methods described herein. In some examples, aspects of the operations of 2010 may be performed by a handover manager as described with reference to FIGS. 9 through 12.

At 2015, the base station may transmit system information that includes an indication that the first cell is associated with a first tracking area indicator and a second tracking area indicator, where the system information is transmitted based on performing the handover procedure. The operations of 2015 may be performed according to the methods described herein. In some examples, aspects of the operations of 2015 may be performed by a communications manager as described with reference to FIGS. 9 through 12.

At 2020, the base station may determine, based on the system information, that the first cell serves a first earth-fixed tracking area associated with the first tracking area indicator and a second earth-fixed tracking area associated with the second tracking area indicator. The operations of 2020 may be performed according to the methods described herein. In some examples, aspects of the operations of 2020 may be performed by a tracking area manager as described with reference to FIGS. 9 through 12.

At 2025, the base station may transmit one or more first paging messages associated with the first earth-fixed tracking area and one or more second paging messages associated with the second earth-fixed tracking area based on determining that the first cell serves the first earth-fixed tracking area and the second earth-fixed tracking area. The operations of 2025 may be performed according to the methods described herein. In some examples, aspects of the operations of 2025 may be performed by a paging resource transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving system information that includes an indication that a first cell of a NTN is associated with a first tracking area indicator and a second tracking area indicator; determining, based at least in part on the system information, that the first cell serves a first earth-fixed tracking area associated with the first tracking area indicator and a second earth-fixed tracking area associated with the second tracking area indicator; and monitoring paging resources associated with the first earth-fixed tracking area based at least in part on determining that the first cell serves the first earth-fixed tracking area and the second earth-fixed tracking area.

Aspect 2: The method of aspect 1, further comprising: determining a terrestrial location of the UE; and determining that the UE is positioned within the first earth-fixed tracking area based at least in part on determining the terrestrial location of the UE, wherein monitoring the paging resources associated with the first earth-fixed tracking area is based at least in part on determining that the UE is positioned within the first earth-fixed tracking area.

Aspect 3: The method of any of aspects 1 through 2, further comprising: determining that the UE was associated with the first earth-fixed tracking area prior to the first cell serving the first earth-fixed tracking area and the second earth-fixed tracking area, wherein monitoring the paging resources associated with the first earth-fixed tracking area is based at least in part on determining that the UE was associated with the first earth-fixed tracking area.

Aspect 4: The method of any of aspects 1 through 3, wherein one of the first tracking area indicator or the second tracking area indicator comprises a temporary tracking area indicator or shorter validity indicator.

Aspect 5: The method of aspect 4, further comprising: determining a paging message for the first earth-fixed tracking area based at least in part on whether the first earth-fixed tracking area comprises the temporary tracking area indicator, wherein monitoring the paging resources of the first earth-fixed tracking area is based at least in part on determining the paging message.

Aspect 6: The method of any of aspects 4 through 5, wherein the second earth-fixed tracking area comprises the temporary tracking area indicator, the method further comprising: identifying that a validity time associated with the temporary tracking area indicator is less than or equal a threshold validity time, wherein monitoring the paging resources associated with the first earth-fixed tracking area is based at least in part on the validity time being less than or equal to the threshold validity time.

Aspect 7: The method of any of aspects 4 through 6, further comprising: receiving, via the system information, an indication of boundary information associated with an earth-fixed tracking area associated with the temporary tracking area indicator, wherein monitoring the paging resources associated with the first earth-fixed tracking area is based at least in part on the boundary information.

Aspect 8: The method of any of aspects 4 through 7, further comprising: receiving a MIB message comprising one or more fields associated with temporary tracking area indicators, wherein the one or more fields indicate whether the system information includes data associated with the temporary tracking area indicator.

Aspect 9: The method of any of aspects 4 through 8, further comprising: identifying a validity time associated with the temporary tracking area indicator based at least in part on receiving the system information; and removing the temporary tracking area indicator from a tracking area indicator list of the UE upon expiration of the validity time associated with the temporary tracking area indicator.

Aspect 10: The method of aspect 9, further comprising: storing the temporary tracking area indicator and one of the first tracking area indicator or the second tracking area indicator in the tracking area indicator list of the UE based at least in part on receiving the system information, wherein removing the temporary tracking area indicator from the tracking area indicator list is based at least in part on storing the temporary tracking area indicator and one of the first tracking area indicator or the second tracking area indicator in the tracking area indicator list.

Aspect 11: The method of any of aspects 4 through 10, wherein the second tracking area indicator comprises the temporary tracking area indicator, the method further comprising: identifying that the UE was associated with the first cell serving the first earth-fixed tracking area and the second earth-fixed tracking area; and identifying that the UE is associated with the first earth-fixed tracking area based at least in part on identifying that the UE was associated with the first cell, wherein monitoring the paging resources is based at least in part on determining that the UE is associated with the first earth-fixed tracking area.

Aspect 12: The method of any of aspects 4 through 11, wherein the second tracking area indicator comprises the temporary tracking area indicator, the method further comprising: identifying that the UE was not associated with the first cell serving the first earth-fixed tracking area and the second earth-fixed tracking area; and identifying that the UE is associated with the first earth-fixed tracking area based at least in part on identifying that the UE was not associated with the first cell, wherein monitoring the paging resources is based at least in part on determining that the UE is associated with the first earth-fixed tracking area.

Aspect 13: The method of aspect 12, further comprising: determining whether to perform a registration update based at least in part on the first tracking area indicator and the second tracking area indicator.

Aspect 14: The method of any of aspects 1 through 13, wherein the first tracking area indicator is indicated via a first tracking area indicator field of the system information, and the second tracking area indicator is indicated via a second tracking area indicator field of the system information.

Aspect 15: The method of any of aspects 1 through 14, wherein determining that the first cell serves the first earth-fixed tracking area and the second earth-fixed tracking area comprises: determining that a tracking area indicator included in a control message is associated with the first earth-fixed tracking area and a temporary tracking area indicator included in the control message is associated with the second earth-fixed tracking area of the NTN.

Aspect 16: The method of any of aspects 1 through 15, further comprising: reporting the first earth-fixed tracking area and the second earth-fixed tracking area to a non-access stratum of the UE.

Aspect 17: The method of any of aspects 1 through 16, wherein monitoring the paging resources associated with the first earth-fixed tracking area comprises: monitoring a paging message associated with the first earth-fixed tracking area using a first P-RNTI that is different than a second P-RNTI associated with the second earth-fixed tracking area.

Aspect 18: The method of any of aspects 1 through 17, further comprising: receiving a SIB message associated with the first cell that indicates a P-RNTI associated with the first earth-fixed tracking area and a temporary P-RNTI associated with the second earth-fixed tracking area; and monitoring a paging message associated with the first earth-fixed tracking area using the P-RNTI associated with the first earth-fixed tracking area.

Aspect 19: The method of any of aspects 1 through 18, further comprising: receiving a DCI that includes an indication of whether a paging message is associated with the first earth-fixed tracking area or is associated with the second earth-fixed tracking area, wherein monitoring the paging resources associated with the first earth-fixed tracking area is based at least in part on receiving the DCI.

Aspect 20: The method of aspect 19, wherein the DCI includes a first value of the indication for the paging message being associated with the first earth-fixed tracking area or a second value of the indication for the paging message being associated with the second earth-fixed tracking area.

Aspect 21: The method of any of aspects 19 through 20, further comprising: determining that a first paging message is associated with the first earth-fixed tracking area and that a second paging message is associated with the second earth-fixed tracking area based at least in part on receiving the DCI.

Aspect 22: The method of any of aspects 19 through 21, wherein the DCI includes a first value of the indication for the paging message being associated with the first earth-fixed tracking area, a second value of the indication for the paging message being associated with the second earth-fixed tracking area, or a third value of the indication for the paging message being associated with both the first earth-fixed tracking area and the second earth-fixed tracking area.

Aspect 23: The method of any of aspects 1 through 22, further comprising: determining the paging resources associated with the first earth-fixed tracking area and second paging resources associated with the second earth-fixed tracking area are the same.

Aspect 24: The method of any of aspects 1 through 23, further comprising: selecting to communicate with the first cell of the NTN, wherein monitoring the paging resources associated with the first earth-fixed tracking area is based at least in part on selecting to communicate with the first cell.

Aspect 25: A method for wireless communication at a base station, comprising: transmitting, to a UE, system information that includes an indication that a first cell of a NTN is associated with a first tracking area indicator and a second tracking area indicator; determining, based at least in part on the system information, that the first cell serves a first earth-fixed tracking area associated with the first tracking area indicator and a second earth-fixed tracking area associated with the second tracking area indicator; and transmitting one or more first paging messages associated with the first earth-fixed tracking area and one or more second paging messages associated with the second earth-fixed tracking area based at least in part on determining that the first cell serves the first earth-fixed tracking area and the second earth-fixed tracking area.

Aspect 26: The method of aspect 25, wherein one of the first tracking area indicator or the second tracking area indicator comprises a temporary tracking area indicator or a shorter validity indicator.

Aspect 27: The method of aspect 26, further comprising: transmitting, to the UE via the system information, a validity time associated with the temporary tracking area indicator.

Aspect 28: The method of any of aspects 26 through 27, wherein the second earth-fixed tracking area comprises the temporary tracking area indicator, the method further comprising: identifying that a validity time associated with the temporary tracking area indicator is less than or equal a threshold validity time, wherein transmitting the one or more first paging messages is based at least in part on the validity time being less than or equal to the threshold validity time.

Aspect 29: An apparatus for wireless communication at a UE, comprising a processor; memory coupled with the processor; and instructions stored in the memory and executable by the processor to cause the apparatus to perform a method of any of aspects 1 through 24.

Aspect 30: An apparatus for wireless communication at a UE, comprising at least one means for performing a method of any of aspects 1 through 24.

Aspect 31: A non-transitory computer-readable medium storing code for wireless communication at a UE, the code comprising instructions executable by a processor to perform a method of any of aspects 1 through 24.

Aspect 32: An apparatus for wireless communication at a base station, comprising a processor; memory coupled with the processor; and instructions stored in the memory and executable by the processor to cause the apparatus to perform a method of any of aspects 25 through 28.

Aspect 33: An apparatus for wireless communication at a base station, comprising at least one means for performing a method of any of aspects 25 through 28.

Aspect 34: A non-transitory computer-readable medium storing code for wireless communication at a base station, the code comprising instructions executable by a processor to perform a method of any of aspects 25 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
at least one processor; and
at least one memory comprising instructions executable by the at least one processor to cause the apparatus to:
receive system information that includes an indication that a first cell of a non-terrestrial network is associated with a first tracking area indicator and a second tracking area indicator;
report, after receiving the system information, a first earth-fixed tracking area to a non-access stratum of a user equipment (UE), the reporting being done in response to the first cell serving the first earth-fixed tracking area associated with the first tracking area indicator and a second earth-fixed tracking area associated with the second tracking area indicator; and
monitor paging resources for a paging message using a first paging radio network temporary identifier, wherein the paging resources are associated with the first earth-fixed tracking area, and wherein the first paging radio network temporary identifier is different from a second paging radio network temporary identifier associated with the second earth-fixed tracking area.

2. The apparatus of claim 1, wherein the at least one processor is further configured to cause the apparatus to:
report, as part of reporting the first earth-fixed tracking area and after receiving the system information, the second earth-fixed tracking area to the non-access stratum of the UE.

3. The apparatus of claim 1, wherein the at least one processor is further configured to cause the apparatus to:
perform a registration update based at least in part on reporting the first tracking area indicator.

4. The apparatus of claim 1, wherein, to monitor the paging resources, the at least one processor is further configured to cause the apparatus to:
monitor the paging resources that are associated with the first earth-fixed tracking area based at least in part on the UE being positioned within the first earth-fixed tracking area.

5. The apparatus of claim 1, wherein, to monitor the paging resources, the at least one processor is further configured to cause the apparatus to:
monitor the paging resources that are associated with the first earth-fixed tracking area based at least in part on the UE being associated with the first earth-fixed tracking area prior to the first cell serving the first earth-fixed tracking area and the second earth-fixed tracking area.

6. The apparatus of claim 1, wherein one of the first tracking area indicator or the second tracking area indicator comprises a temporary tracking area indicator or shorter validity indicator.

7. The apparatus of claim 6, wherein, to monitor the paging resources, the at least one processor is further configured to cause the apparatus to:
monitor the paging resources of the first earth-fixed tracking area based at least in part on whether the first earth-fixed tracking area comprises the temporary tracking area indicator.

8. The apparatus of claim 6, wherein the second earth-fixed tracking area comprises the temporary tracking area indicator, and the instructions are further executable by the at least one processor to cause the apparatus to:
identify that a validity time associated with the temporary tracking area indicator is less than or equal a threshold validity time; and
monitor the paging resources that are associated with the first earth-fixed tracking area based at least in part on the validity time being less than or equal to the threshold validity time.

9. The apparatus of claim 6, wherein the at least one processor is further configured to cause the apparatus to:
receive, via the system information, an indication of boundary information associated with an earth-fixed tracking area associated with the temporary tracking area indicator; and
monitor the paging resources that are associated with the first earth-fixed tracking area based at least in part on the boundary information.

10. The apparatus of claim 6, wherein the at least one processor is further configured to cause the apparatus to:
receive a master information block message comprising one or more fields associated with temporary tracking area indicators, wherein the one or more fields indicate whether the system information includes data associated with the temporary tracking area indicator.

11. The apparatus of claim 6, wherein the at least one processor is further configured to cause the apparatus to:
identify a validity time associated with the temporary tracking area indicator based at least in part on receiving the system information; and
remove the temporary tracking area indicator from a tracking area indicator list of the UE upon expiration of the validity time associated with the temporary tracking area indicator.

12. The apparatus of claim 11, wherein the at least one processor is further configured to cause the apparatus to:
store the temporary tracking area indicator and one of the first tracking area indicator or the second tracking area indicator in the tracking area indicator list of the UE based at least in part on receiving the system information, wherein removing the temporary tracking area indicator from the tracking area indicator list is based at least in part on storing the temporary tracking area indicator and one of the first tracking area indicator or the second tracking area indicator in the tracking area indicator list.

13. The apparatus of claim 6, wherein the second tracking area indicator comprises the temporary tracking area indicator, and wherein the at least one processor is further configured to cause the apparatus to:
identify that the UE was associated with the first cell serving the first earth-fixed tracking area and the second earth-fixed tracking area; and
identify that the UE is associated with the first earth-fixed tracking area based at least in part on identifying that the UE was associated with the first cell, wherein reporting the first earth-fixed tracking area is based at least in part on receiving the system information.

14. The apparatus of claim 6, wherein the second tracking area indicator comprises the temporary tracking area indicator, and wherein the at least one processor is further configured to cause the apparatus to:
identify that the UE was not associated with the first cell serving the first earth-fixed tracking area and the second earth-fixed tracking area; and
identify that the UE is associated with the first earth-fixed tracking area based at least in part on identifying that the UE was not associated with the first cell, wherein reporting the first earth-fixed tracking area is based at least in part on receiving the system information.

15. The apparatus of claim 14, wherein the at least one processor is further configured to cause the apparatus to:
whether to perform a registration update based at least in part on the first tracking area indicator and the second tracking area indicator.

16. The apparatus of claim 1, wherein:
the first tracking area indicator is indicated via a first tracking area indicator field of the system information, and
the second tracking area indicator is indicated via a second tracking area indicator field of the system information.

17. The apparatus of claim 1, wherein a tracking area indicator included in a control message is associated with the first earth-fixed tracking area and a temporary tracking area indicator included in the control message is associated with the second earth-fixed tracking area of the non-terrestrial network.

18. The apparatus of claim 1, wherein the at least one processor is further configured to cause the apparatus to:
receive a system information broadcast message associated with the first cell that indicates the first paging radio network temporary identifier associated with the first earth-fixed tracking area and a temporary paging radio network temporary identifier associated with the second earth-fixed tracking area, wherein the temporary paging radio network temporary identifier is the second paging radio network temporary identifier; and
monitor the paging message associated with the first earth-fixed tracking area using the first paging radio network temporary identifier associated with the first earth-fixed tracking area.

19. The apparatus of claim 1, wherein the at least one processor is further configured to cause the apparatus to:
receive a downlink control information that includes an indication of whether the paging message is associated with the first earth-fixed tracking area or is associated with the second earth-fixed tracking area; and monitor the paging resources associated with the first earth-fixed tracking area based at least in part on reception of the downlink control information.

20. The apparatus of claim 19, wherein the downlink control information includes a first value of the indication for the paging message being associated with the first earth-fixed tracking area or a second value of the indication for the paging message being associated with the second earth-fixed tracking area.

21. The apparatus of claim 19, wherein a first paging message is associated with the first earth-fixed tracking area and that a second paging message is associated with the second earth-fixed tracking area.

22. The apparatus of claim 19, wherein the downlink control information includes a first value of the indication for the paging message being associated with the first earth-fixed tracking area, a second value of the indication for the paging message being associated with the second earth-fixed tracking area, or a third value of the indication for the paging message being associated with both the first earth-fixed tracking area and the second earth-fixed tracking area.

23. The apparatus of claim 1, wherein, to monitor the paging resources, the at least one processor is configured to cause the apparatus to:
monitor first paging resources associated with the first earth-fixed tracking area and second paging resources associated with the second earth-fixed tracking area based at least in part on the first paging resources and the second paging resources being the same.

24. The apparatus of claim 1, wherein the at least one processor is further configured to cause the apparatus to:
select to communicate with the first cell of the non-terrestrial network.

25. A method for wireless communication at a user equipment (UE), comprising:
receiving system information that includes an indication that a first cell of a non-terrestrial network is associated with a first tracking area indicator and a second tracking area indicator;
reporting, after receiving the system information, a first earth-fixed tracking area to a non-access stratum of the UE, the reporting being done in response to the first cell serving the first earth-fixed tracking area associated with the first tracking area indicator and a second earth-fixed tracking area associated with the second tracking area indicator; and
monitoring paging resources for a paging message using a first paging radio network temporary identifier, wherein the paging resources are associated with the first earth-fixed tracking area, and wherein the first paging radio network temporary identifier is different from a second paging radio network temporary identifier associated with the second earth-fixed tracking area.

26. A user equipment (UE), comprising:
a transceiver;
at least one processor; and
at least one memory comprising instructions executable by the at least one processor to cause the UE to:
receive, via the transceiver, system information that includes an indication that a first cell of a non-terrestrial network is associated with a first tracking area indicator and a second tracking area indicator;
report, after receiving the system information, a first earth-fixed tracking area to a non-access stratum of the UE, the reporting being done in response to the first cell serving the first earth-fixed tracking area associated with the first tracking area indicator and a second earth-fixed tracking area associated with the second tracking area indicator; and monitor paging resources for a paging message using a first paging radio network temporary identifier, wherein the paging resources are associated with the first earth-fixed tracking area, and wherein the first paging radio network temporary identifier is different from a second paging radio network temporary identifier associated with the second earth-fixed tracking area.

\* \* \* \* \*